United States Patent
Yamashita

(10) Patent No.: US 9,868,331 B2
(45) Date of Patent: Jan. 16, 2018

(54) SHOCK ABSORBER

(71) Applicant: HITACHI AUTOMOTIVE SYSTEMS, LTD., Ibaraki (JP)

(72) Inventor: Mikio Yamashita, Zama (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 0 days.

(21) Appl. No.: 15/039,483

(22) PCT Filed: Nov. 21, 2014

(86) PCT No.: PCT/JP2014/080935
§ 371 (c)(1),
(2) Date: May 26, 2016

(87) PCT Pub. No.: WO2015/080056
PCT Pub. Date: Jun. 4, 2015

(65) Prior Publication Data
US 2017/0080767 A1    Mar. 23, 2017

(30) Foreign Application Priority Data
Nov. 29, 2013 (JP) ................................. 2013-248367

(51) Int. Cl.
*F16F 9/348* (2006.01)
*B60G 13/08* (2006.01)
(Continued)

(52) U.S. Cl.
CPC ............... *B60G 13/08* (2013.01); *F16F 9/18* (2013.01); *F16F 9/182* (2013.01); *F16F 9/34* (2013.01);
(Continued)

(58) Field of Classification Search
CPC ...... F16F 9/18; F16F 9/34; F16F 9/348; F16F 9/3482; F16F 9/3484; F16F 9/50;
(Continued)

(56) References Cited

U.S. PATENT DOCUMENTS 7,322,449 B2 * 1/2008 Yamaguchi ............. F16F 9/348
                                                188/282.3
7,458,448 B2 * 12/2008 Katou .................... F16F 9/3485
                                                188/282.6
(Continued)

FOREIGN PATENT DOCUMENTS

| JP | 2004-257507 | 9/2004 |
| JP | 2006-038097 | 2/2006 |
| JP | 2008-138740 | 6/2008 |

OTHER PUBLICATIONS

International Search Report for PCT/JP2014/080935, dated Jan. 13, 2015, 3 pages.
(Continued)

*Primary Examiner* — Thomas Irvin
(74) *Attorney, Agent, or Firm* — Mattingly & Malur, PC

(57) ABSTRACT

A shock absorber includes: a damping valve that suppresses a flow of operating fluid due to the sliding of a piston to generate damping force; a bottomed tubular pilot case that forms a pilot chamber that causes pressure to act on the damping valve in a valve closing direction, together with the damping valve; and an annular seal member (146) that is provided to be fixed to the outer circumferential side of a rear surface of the damping valve, and is fitted into a tube of the pilot case so as to be slidable and to be in a liquid tight manner. A part of the flow of the operating fluid is guided to the pilot chamber and opening of the damping valve is suppressed by the pressure of the pilot chamber. An annular concave portion (380) is formed on the outer circumferential side of the seal member (146), and an annular convex (Continued)

portion (385) is formed on the inner circumferential side of the seal member (146).

5 Claims, 7 Drawing Sheets

(51) Int. Cl.
*F16F 9/34* (2006.01)
*F16F 9/50* (2006.01)
*F16J 15/16* (2006.01)
*F16J 15/32* (2016.01)
*F16J 15/56* (2006.01)
*F16F 9/18* (2006.01)
*F16F 9/504* (2006.01)

(52) U.S. Cl.
CPC ............... *F16F 9/348* (2013.01); *F16F 9/50* (2013.01); *F16F 9/504* (2013.01); *F16J 15/16* (2013.01); *F16J 15/32* (2013.01); *F16J 15/56* (2013.01); *B60G 2202/24* (2013.01); *B60G 2500/04* (2013.01); *B60G 2500/11* (2013.01); *B60G 2800/162* (2013.01); *F16F 9/185* (2013.01); *F16F 9/3482* (2013.01); *F16F 9/3484* (2013.01); *F16F 2228/066* (2013.01)

(58) Field of Classification Search
CPC ...... F16F 9/504; F16F 9/185; F16F 2228/006; B60G 13/08; B60G 2202/24; B60G 2500/04; B60G 2500/11; B60G 2800/162; F16J 15/16; F16J 15/32; F16J 15/56
See application file for complete search history.

(56) References Cited

U.S. PATENT DOCUMENTS

| | | | | |
|---|---|---|---|---|
| 8,544,619 B2* | 10/2013 | Yamaguchi | ............ | F16F 9/3485 188/266.6 |
| 8,584,818 B2* | 11/2013 | Murakami | ............ | F16F 9/348 188/322.13 |
| 8,794,405 B2* | 8/2014 | Yamashita | ............ | B60G 13/08 188/317 |
| 9,206,876 B2* | 12/2015 | Yamashita | ............ | F16F 9/3485 |
| 9,285,006 B2* | 3/2016 | Katayama | ............ | F16F 9/325 |
| 9,309,947 B2* | 4/2016 | Kitagawa | ............ | B29C 45/1459 |
| 9,353,822 B2* | 5/2016 | Yamasaki | ............ | F16F 9/325 |
| 9,500,252 B2* | 11/2016 | Yamashita | ............ | F16F 9/369 |
| 9,500,256 B2* | 11/2016 | Yamashita | ............ | F16F 9/348 |
| 9,597,941 B2* | 3/2017 | Yamashita | ............ | B60G 13/08 |
| 2009/0272611 A1* | 11/2009 | Hayama | ............ | F16F 9/3485 188/282.1 |
| 2011/0209956 A1* | 9/2011 | Maeda | ............ | F16F 9/3488 188/322.13 |
| 2011/0214955 A1* | 9/2011 | Maeda | ............ | F16F 9/34 188/280 |
| 2012/0048666 A1* | 3/2012 | Murakami | ............ | F16F 9/348 188/315 |
| 2012/0160620 A1* | 6/2012 | Yamashita | ............ | B60G 13/08 188/266.5 |
| 2012/0305349 A1* | 12/2012 | Murakami | ............ | F16F 9/325 188/266.6 |
| 2014/0252735 A1* | 9/2014 | Yamashita | ............ | F16F 9/342 280/6.157 |
| 2014/0291088 A1* | 10/2014 | Katayama | ............ | F16F 9/3485 188/313 |
| 2015/0041265 A1* | 2/2015 | Yamashita | ............ | F16F 9/18 188/315 |
| 2015/0275999 A1* | 10/2015 | Mori | ............ | F16F 9/18 188/313 |
| 2016/0040742 A1* | 2/2016 | Yamashita | ............ | F16F 9/342 188/284 |
| 2016/0061284 A1* | 3/2016 | Yamashita | ............ | F16F 9/369 188/313 |
| 2016/0195152 A1* | 7/2016 | Mori | ............ | F16F 9/465 188/313 |
| 2017/0080767 A1* | 3/2017 | Yamashita | ............ | F16F 9/34 |

OTHER PUBLICATIONS

Written Opinion of the ISA for PCT/JP2014/080935 (foreign language), dated Jan. 13, 2015, 3 pages.

* cited by examiner

SHOCK ABSORBER

TECHNICAL FIELD

The present invention relates to a shock absorber.

This application is the U.S. national phase of International Application No. PCT/JP2014/080935 filed Nov. 21 2014, which designated the U.S. and claims priority to Japanese Patent Application No. 2013-248367, filed Nov. 29, 2013, the entire contents of each of which are incorporated herein by reference.

BACKGROUND ART

There is a shock absorber in which a seal member is provided on the outer circumferential side of a rear surface of a valve that opens and closes a flow path, a pilot chamber is configured of the seal member and a pilot case, and the pressure of the pilot chamber is caused to act on the valve in a valve closing direction (for example, refer to PTL 1).

CITATION LIST

Patent Literature

[PTL 1] Japanese Unexamined Patent Application, First Publication No. 2006-38097

SUMMARY OF INVENTION

Technical Problem

It is desired to improve the durability of the seal member.

The present invention provides a shock absorber capable of improving the durability of a seal member.

Solution to Problem

According to a first aspect of the invention, a shock absorber includes: a cylinder in which operating fluid is enclosed; a piston that is slidably fitted into the cylinder; a piston rod of which a first end side is coupled to the piston and a second end side extends to the outside of the cylinder; a damping valve that suppresses a flow of the operating fluid due to the sliding of the piston to generate damping force; a bottomed tubular pilot case that forms a pilot chamber that causes pressure to act on the damping valve in a valve closing direction, together with the damping valve; and an annular seal member that is provided to be fixed to the outer circumferential side of a rear surface of the damping valve, and is fitted into a tube of the pilot case so as to be slidable and to be in a liquid tight manner. The damping valve is configured such that the inner circumferential side of the damping valve is clamped and the outer circumferential side of the damping valve is opened, and a part of the flow of the operating fluid is guided to the pilot chamber and opening of the damping valve is suppressed by the pressure of the pilot chamber. An annular concave portion is formed on the outer circumferential side of the seal member, and an annular convex portion is formed on the inner circumferential side of the seal member.

According to a second aspect of the invention, a shock absorber includes: a cylinder in which operating fluid is enclosed; a piston that is slidably fitted into the cylinder; a piston rod of which a first end side is coupled to the piston and a second end side extends to the outside of the cylinder; a damping valve that suppresses a flow of the operating fluid due to the sliding of the piston to generate damping force; a bottomed tubular pilot case that forms a pilot chamber that causes pressure to act on the damping valve in a valve closing direction, together with the damping valve; and an annular seal member that is provided to be fixed to the outer circumferential side of a rear surface of the damping valve, and is fitted into a tube of the pilot case so as to be slidable and to be in a liquid tight manner. The damping valve is configured such that the inner circumferential side of the damping valve is clamped and the outer circumferential side of the damping valve is opened, and a part of the flow of the operating fluid is guided to the pilot chamber and opening of the damping valve is suppressed by the pressure of the pilot chamber. An annular concave portion is formed on an outer circumferential portion of the seal member, and a height of a minimum diameter portion of the concave portion from the damping valve is greater than ⅓ of a height of a maximum diameter portion from the damping valve, the maximum diameter portion having the largest diameter in a side farther from the damping valve on the outer circumferential portion of the seal member than the minimum diameter portion.

According to a third aspect of the invention, in the first or second aspect, the maximum diameter portion having the largest diameter may be formed on the outer circumferential side of the seal member further on a side separating from the damping valve than the annular concave portion, and a damping-valve-side convex portion that protrudes further outward in a radial direction than the maximum diameter portion may be provided on the damping valve side of the seal member.

According to a fourth aspect of the invention, in any of the first to third aspects, a distance of an apex of the convex portion from the damping valve may be greater than a distance of the minimum diameter portion of the concave portion from the damping valve.

ADVANTAGEOUS EFFECTS OF INVENTION

According to the shock absorber described above, it is possible to improve the durability of the seal member.

DESCRIPTION OF EMBODIMENTS

Figure 1:
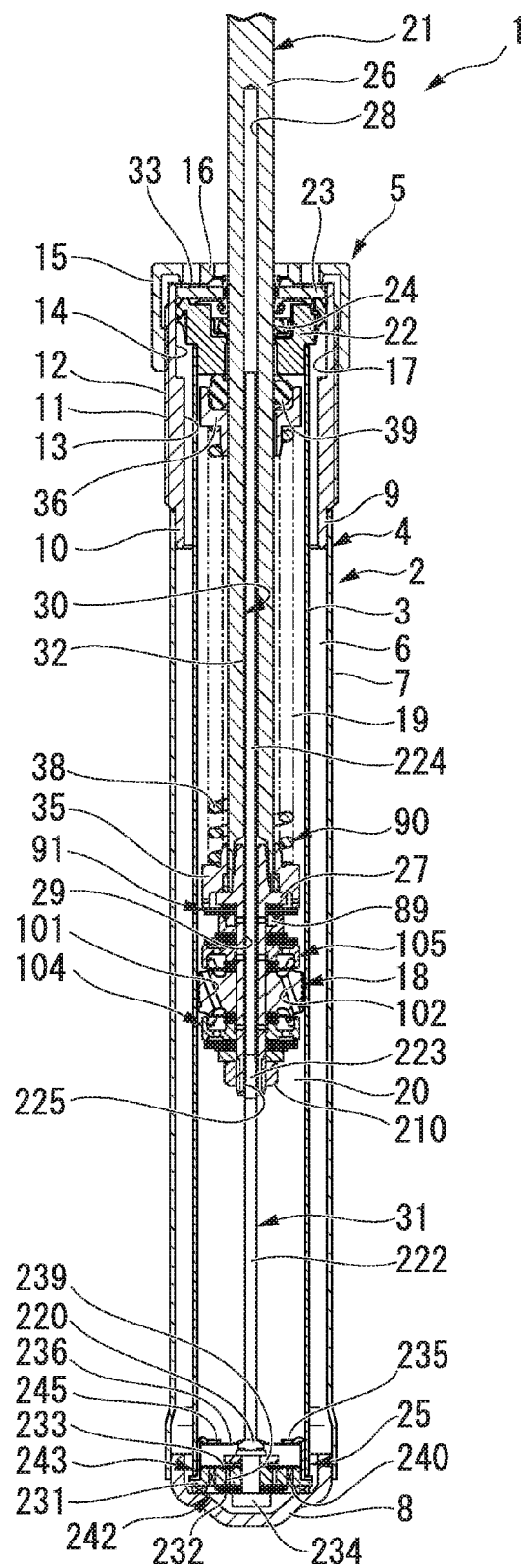
FIG. 1 is a sectional view illustrating a shock absorber according to an embodiment of the invention.

Hereinafter, an embodiment according to the invention will be described with reference to the drawings. In the following description, in order to aid the understanding, the lower side of the drawing is defined as a first side and a lower side, and the upper side of the drawing is defined as a second side and an upper side.

A shock absorber 1 of the embodiment is a position-sensitive damping force control type shock absorber. As illustrated in FIG. 1, the shock absorber 1 of the embodiment is a so called double cylinder type hydraulic shock absorber, and includes a cylinder 2 in which oil as operating liquid is enclosed. The cylinder 2 includes a cylindrical inner tube 3, a bottomed cylindrical outer tube 4 that has a diameter larger than that of the inner tube 3 and is concentrically provided to cover the inner tube 3, and a cover 5 that covers an upper opening side of the outer tube 4. A reservoir chamber 6 is formed between the inner tube 3 and the outer tube 4.

The outer tube 4 is configured of an approximately cylindrical barrel member 7, a bottom member 8 that is fitted into and fixed in the lower portion side of the barrel member 7 and blocks the barrel member 7, and an approximately cylindrical mouthpiece member 9 that is fitted into and fixed on the upper portion side of the barrel member 7.

The mouthpiece member 9 is press-fitted to the barrel member 7 so as to be fitted into and fixed in a small diameter portion 10 formed on an outer circumferential portion of a lower portion of the mouthpiece member 9. The upper side of the small diameter portion 10 of the mouthpiece member 9 is a large diameter portion 11 that has a diameter larger than that of the small diameter portion 10. A male screw 12 is formed on an outer circumferential portion of the large diameter portion 11. In addition, an inner circumferential portion of the lower portion of the mouthpiece member 9 configures a small diameter inner circumferential portion 13, and an inner circumferential portion of an upper portion of the mouthpiece member 9 configures a large diameter inner circumferential portion 14 that has a diameter larger than that of the small diameter inner circumferential portion 13.

The cover 5 includes a tubular portion 15 and an inner flange portion 16 that extends inward in a radial direction from an upper end side of the tubular portion 15, and a female screw 17 is formed on an inner circumferential portion of the tubular portion 15. The cover 5 covers an upper end opening portion of the mouthpiece member 9, and is fixed by screwing the female screw 17 formed on the tubular portion 15 with the male screw 12 of the mouthpiece member 9.

A piston 18 is slidably fitted into the inner tube 3. The piston 18 partitions the inside of the inner tube 3 into two chambers of an upper chamber 19 and a lower chamber 20. Oil as operating fluid is enclosed in the upper chamber 19 and the lower chamber 20 in the inner tube 3. Oil and gas as operating fluid is enclosed in the reservoir chamber 6 between the inner tube 3 and the outer tube 4.

A first end side of a piston rod 21 is inserted into the cylinder 2. A second end side of the piston rod 21 extends to the outside of the cylinder 2. The piston 18 is coupled to the first end side of the piston rod 21 in the cylinder 2. A rod guide 22 is fitted into the mouthpiece member 9 on a first end opening side of the inner tube 3 and the outer tube 4. A seal member 23 is mounted in the mouthpiece member 9, further on the outer side of the cylinder 2 than the rod guide 22. A friction member 24 is provided on the rod guide 22 at a position further on the inner side of the cylinder 2 than the seal member 23. All of the rod guide 22, the seal member 23, and the friction member 24 are formed into an annular shape. The piston rod 21 is slidably inserted into the inside of the rod guide 22, the friction member 24, and the seal member 23 and extends to the outside of the cylinder 2.

Here, the rod guide 22 guides the movement of the piston rod 21 by supporting the piston rod 21 so that the piston rod 21 can move in an axial direction while restricting the movement of the piston rod 21 in the radial direction. An inner circumferential portion of the seal member 23 is in sliding contact with an outer circumferential portion of the piston rod 21 that moves in the axial direction so as to prevent the oil in the inner tube 3 and high pressure gas and oil in the reservoir chamber 6 in the outer tube 4 from leaking to the outside.

An inner circumferential portion of the friction member 24 is in sliding contact with the outer circumferential portion of the piston rod 21 so as to generate frictional resistance on the piston rod 21. The friction member 24 is not intended to perform sealing.

The rod guide 22 is formed into a stepped shape in which the outer circumferential portion of an upper portion of the rod guide 22 has a diameter larger than that of the outer circumferential portion of a lower portion of the rod guide 22. The lower portion of the rod guide 22 is fitted into an inner circumferential portion of an upper end of the inner tube 3 and the upper portion thereof is fitted into the large diameter inner circumferential portion 14 of the mouthpiece member 9 of the outer tube 4. A base valve 25 which partitions between the lower chamber 20 in the inner tube 3 and the reservoir chamber 6 is provided on the bottom member 8 of the outer tube 4. The inner circumferential portion of a lower end of the inner tube 3 is fitted into the base valve 25. An annular pressing member 33 is disposed between the inner flange portion 16 of the cover 5 and the seal member 23. If the female screw 17 of the cover 5 is screwed with the male screw 12 of the outer tube 4, the pressing member 33 and the seal member 23 are interposed between the inner flange portion 16 and the rod guide 22 that is fitted into the inner tube 3.

The piston rod 21 is configured of a rod main body 26 that is inserted into the rod guide 22, the friction member 24, and the seal member 23 and extends to the outside, a tip rod 27 that is screwed to be integrally coupled to an end portion of the rod main body 26 in the cylinder 2, and a nut 210 that is screwed with the tip rod 27. An insertion hole 28 along the axial direction is formed in the center of the rod main body 26 in the radial direction from the tip rod 27 side to an intermediate position in the vicinity of the end portion on the opposite side. In addition, a though hole 29 along the axial direction is formed in the center of the tip rod 27 in the radial direction. The insertion hole 28 and the though hole 29 configure an insertion hole 30 that is formed in the center of the piston rod 21 in the radial direction. In this manner, the piston rod 21 is formed into a hollow structure. A metering pin 31 is inserted into the insertion hole 30 of the piston rod 21. A first end side of the metering pin 31 is fixed to the base valve 25 that is provided on the first side of the cylinder 2, and a second end side thereof is inserted into the insertion hole 30 of the piston rod 21. An in-rod passage 32 through which oil can flow in the piston rod 21 is configured between the insertion hole 30 and the metering pin 31.

An annular piston-side spring bearing 35 is provided on the piston 18 side in the axial direction of the outer circumferential side of the rod main body 26 of the piston rod 21. An annular rod-guide-side spring bearing 36 is provided on the side of the piston-side spring bearing 35 opposite to the piston 18 in the axial direction of the outer circumferential side of the rod main body 26 of the piston rod 21. The piston-side spring bearing 35 and the rod-guide-side spring bearing 36 can slide along the rod main body 26 by inserting the rod main body 26 therethrough. A rebound spring 38 configured of a coil spring is interposed between the piston-side spring bearing 35 and the rod-guide-side spring bearing 36 so as to insert the rod main body 26 therethrough. An annular buffer 39 formed of an elastic material is provided on a side of the rod-guide-side spring bearing 36 opposite to the rebound spring 38 in the axial direction. The buffer 39 can also slide along the rod main body 26 by inserting the rod main body 26 therethrough.

In the shock absorber 1 described above, the first side of the shock absorber is supported by a vehicle body and a second side of the shock absorber is coupled to a vehicle wheel side, for example. Specifically, the piston rod 21 is coupled to the vehicle body side, and the side of the cylinder 2 opposite to the protrusion side of the piston rod 21 is coupled to the vehicle wheel side. Note that, in contrast to the above description, the second side of the shock absorber 1 may be supported by the vehicle body and the first side of the shock absorber 1 may be fixed to the vehicle wheel side.

If the vehicle wheel vibrates according to the traveling, the positions of the cylinder 2 and the piston rod 21 are relatively changed according to the vibration. However, the change is suppressed by fluid resistance of the in-rod passage 32 formed in the piston rod 21. As described below in detail, the fluid resistance of the in-rod passage 32 formed in the piston rod 21 is set to be different depending on the frequency or the amplitude of the vibration, and the ride quality is improved by suppressing the vibration. In addition to the vibration that the vehicle wheel generates, inertia force or centrifugal force that is generated in the vehicle body according to the traveling of the vehicle also act on a space between the cylinder 2 and the piston rod 21. For example, centrifugal force is generated in the vehicle body by the change of the traveling direction by an operation of the steering wheel, and force based on the centrifugal force acts on the space between the cylinder 2 and the piston rod 21. As described below, the shock absorber 1 of the embodiment has favorable characteristics for the force generated in the vehicle body according to the traveling of the vehicle, and thus high stability at the time of the traveling of the vehicle can be obtained.

Figure 2:
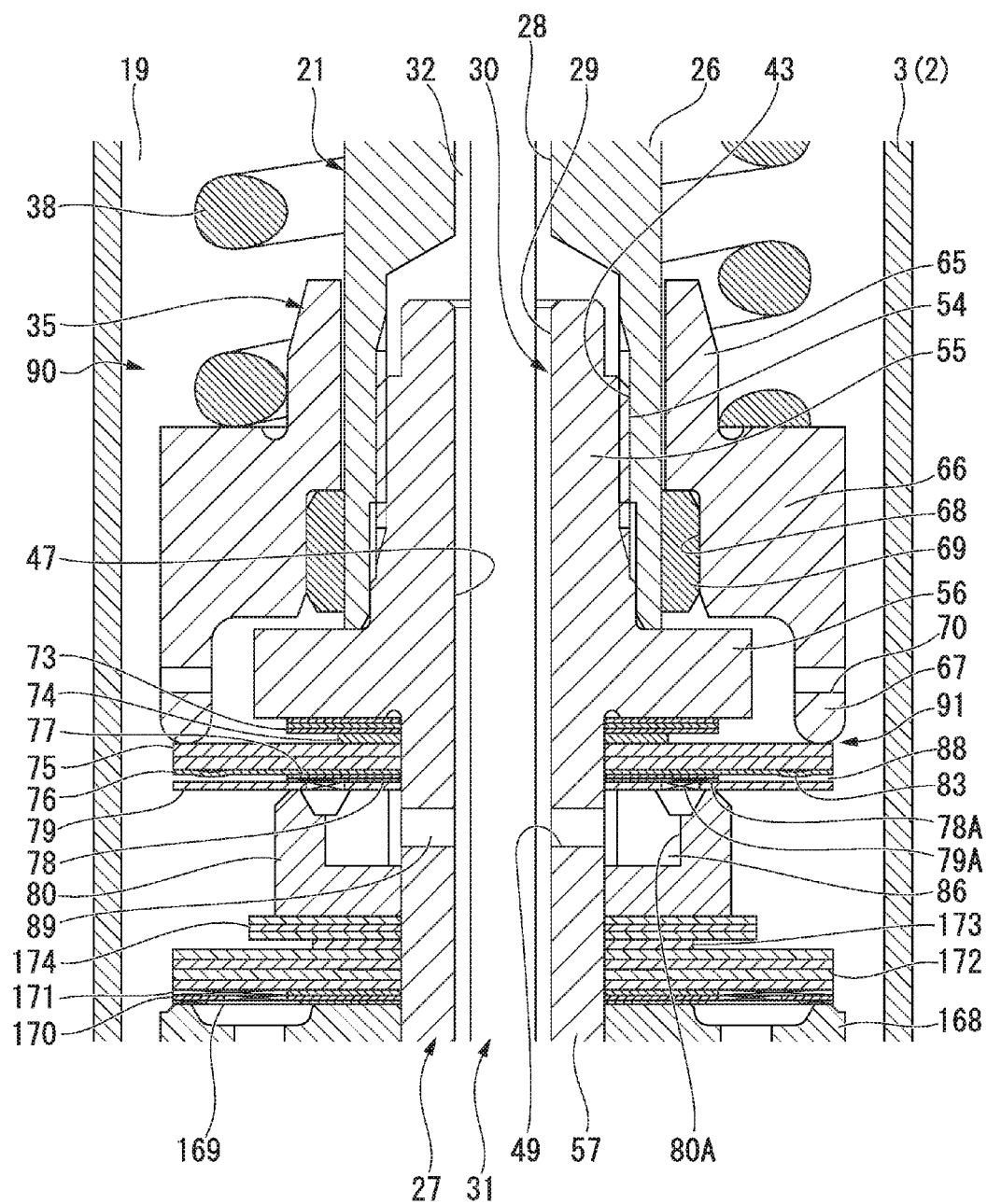
FIG. 2 is a partial enlarged sectional view illustrating the periphery of one passage area adjustment mechanism of the shock absorber according to the embodiment of the invention.
Figure 3:
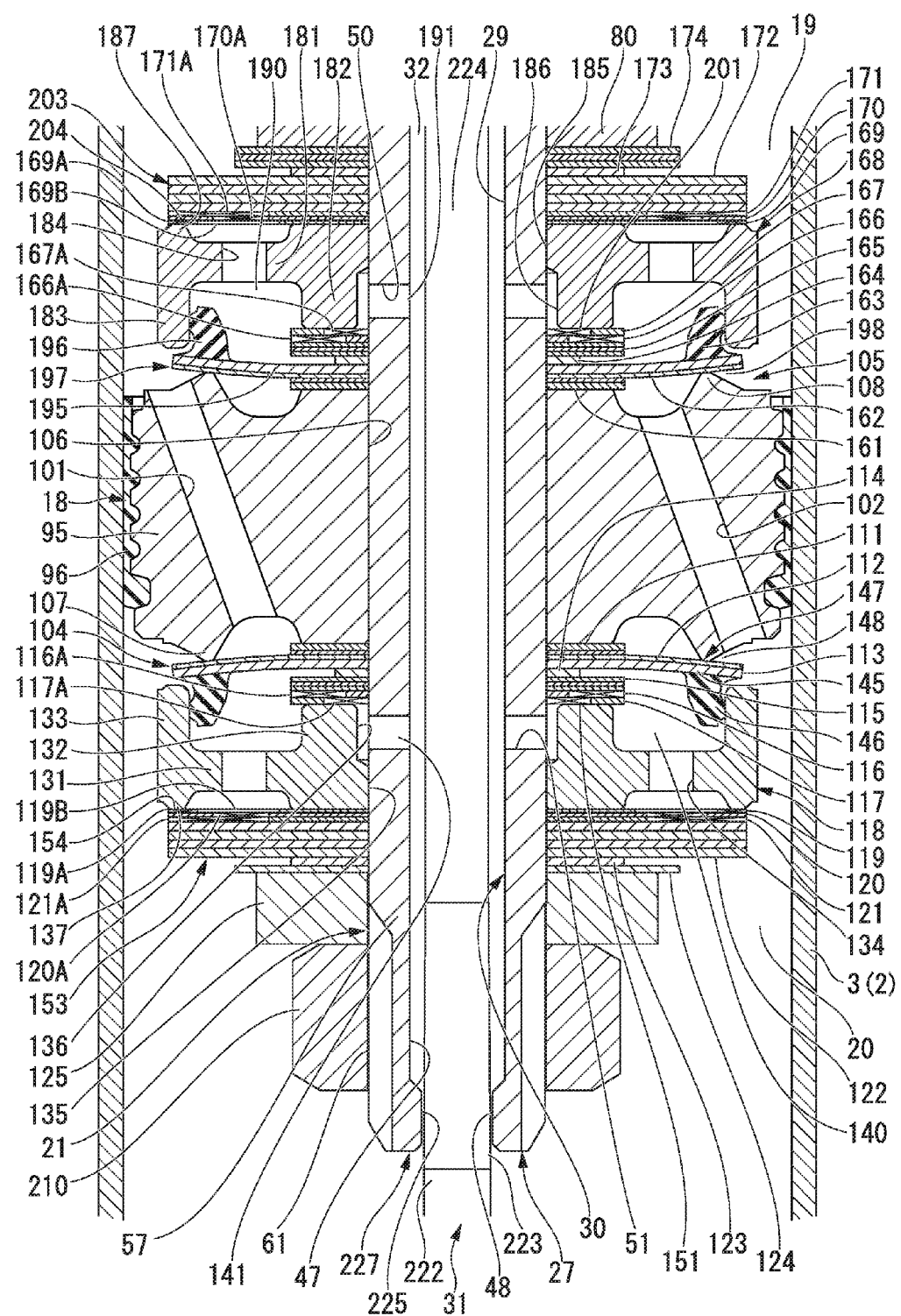
FIG. 3 is a partial enlarged sectional view illustrating the periphery of a piston of the shock absorber according to the embodiment of the invention.

As described in FIG. 2, a screw hole 43 which has a larger diameter than that of the insertion hole 28 and communicates with the insertion hole 28 is formed on the end portion of the rod main body 26 on the tip rod 27 side. The though hole 29 that forms the in-rod passage 32 of the tip rod 27 is configured of a main hole portion 47 substantially configuring the entire through hole 29, and a small diameter hole portion 48 that is formed only on a lower end portion as described in FIG. 3 and has a smaller diameter than that of the main hole portion 47. In order from the rod main body 26 side illustrated in FIG. 2, a passage hole 49, and a passage hole 50 and the passage hole 51 that are illustrated in FIG. 3 are formed in the tip rod 27 so as to pass through the tip rod 27 in the radial direction. All the passage holes 49 to 51 are formed at a position of the main hole portion 47 of the tip rod 27 in the axial direction, and are orthogonal to the though hole 29.

As described in FIG. 2, in order from the rod main body 26 side in the axial direction, the tip rod 27 includes a screw shaft portion 55 of which a male screw 54 is formed on an outer circumferential portion, a flange portion 56, and a holding shaft portion 57. The screw shaft portion 55 is screwed with the screw hole 43 of the rod main body 26 by using the male screw 54 when the tip rod 27 is integrated with the rod main body 26. Since the flange portion 56 comes into contact with the rod main body 26 when the tip rod 27 is integrated with the rod main body 26, the flange portion 56 is formed to have an outer diameter larger than those of the screw shaft portion 55 and the rod main body 26. The holding shaft portion 57 is formed to have a smaller diameter than that of the flange portion 56. A male screw 61 illustrated in FIG. 3 is formed on a portion of the holding shaft portion 57 on a side opposite to the flange portion 56 in the axial direction. The above described passage holes 49 to 51 are formed further on the flange portion 56 side illustrated in FIG. 2 than the male screw 61 of the holding shaft portion 57.

As described in FIG. 2, the piston-side spring bearing 35 includes a cylindrical portion 65; an intermediate body portion 66 that extends from the first end side of the cylindrical portion 65 in the axial direction to the outside in the radial direction; and a cylindrical pressing portion 67 that protrudes from the outer circumferential portion of the intermediate body portion 66 to the side opposite to the cylindrical portion 65 in the axial direction. In the piston-side spring bearing 35, an end surface of the intermediate body portion 66 on the cylindrical portion 65 in the axial direction comes into contact with an end portion of the rebound spring 38 in the axial direction in a state where the cylindrical portion 65 is disposed inside the rebound spring 38. In the piston-side spring bearing 35, an end surface of the intermediate body portion 66 on the pressing portion 67 side in the axial direction can come into contact with the flange portion 56 of the tip rod 27. The inner circumferential portion of the intermediate body portion 66 on the cylindrical portion 65 side in the axial direction is formed to have the same diameter as the inner diameter of the cylindrical portion 65, and the inner circumferential portion of the intermediate body portion 66 on the pressing portion 67 side in the axial direction has a stepped portion 68 that has a larger diameter than the inner diameter of the cylindrical portion 65. A sliding member 69 is fitted into and fixed in the stepped portion 68, and the sliding member 69 slides on the outer circumferential surface of the rod main body 26. A plurality of through holes 70 that pass through the pressing portion 67 in the radial direction are formed in the pressing portion 67.

In order from the flange portion 56 side, a plurality of discs 73, a single disc 74, a plurality of bias discs 75, a single opening and closing disc 76, a single intermediate disc 77, a single intermediate disc 78, a single contact disc 79, and a passage forming member 80 are provided on the holding shaft portion 57 of the tip rod 27.

Each of the plurality of discs 73 is formed into a perforated disc shape, and has an outer diameter smaller than the inner diameter of the pressing portion 67 of the piston-side spring bearing 35. The disc 74 is formed into a perforated disc shape having an outer diameter smaller than that of the disc 73. Each of the plurality of bias discs 75 is formed into a perforated disc shape, and has an outer diameter substantially the same as the outer diameter of a tip portion of the pressing portion 67 of the piston-side spring bearing 35.

The opening and closing disc 76 is formed into a perforated disc shape, and has an outer diameter substantially the same as the outer diameter of the bias discs 75. An annular opening and closing portion 83, which is recessed toward the second side in the axial direction from a first surface in the axial direction and protrudes from a second surface in the axial direction toward the second side in the axial direction, is provided on the outer circumferential side of the opening and closing disc 76.

The intermediate disc 77 is formed into a perforated disc shape, and has an outer diameter smaller than that of the opening and closing disc 76. The intermediate disc 78 is formed into a perforated disc shape having the same outer diameter as the intermediate disc 77. In addition, a plurality of notches 78A are formed on the outer circumferential side of the intermediate disc 78. The contact disc 79 is formed into a perforated disc shape, and has the same outer diameter as the opening and closing disc 76. A C-shaped through hole 79A is formed in an intermediate portion of the contact disc 79 in the radial direction.

The passage forming member 80 is formed into a perforated disc shape, and has an outer diameter smaller than that of the contact disc 79. A plurality of notches 80A are formed on the inner circumferential side of the passage forming member 80. A passage 86 is formed by the notches 78A that are formed on the outer circumferential portion of the intermediate disc 78, the through hole 79A that is formed in an intermediate position of the contact disc 79 in the radial direction, and the notches 80A that are formed on the inner circumferential portion of the passage forming member 80. The passage 86 causes the outer side of the intermediate disc 78 in the radial direction, that is, the upper chamber 19 to communicate with the passage hole 49.

In a state of not being pressed by the piston-side spring bearing 35, the plurality of bias discs 75 are formed into a flat shape, and cause the opening and closing portion 83 of the opening and closing disc 76 to be separated from the contact disc 79.

Here, a gap between the opening and closing portion 83 of the opening and closing disc 76 and the contact disc 79, and the passage 86 formed by the intermediate disc 78, the contact disc 79, and the passage forming member 80 configure an orifice 88. The orifice 88 and the passage hole 49 of the tip rod 27 configure a passage 89 that causes the upper chamber 19 to communicate with the in-rod passage 32.

The intermediate body portion 66 of the piston-side spring bearing 35 is separated from the flange portion 56 of the tip rod 27 in the axial direction by biasing force mainly of the plurality of bias discs 75. In this state, the piston rod 21 is moved to the extension side toward which the piston rod 21 protrudes from the cylinder 2, that is, to the upper side, the piston-side spring bearing 35, the rebound spring 38, and the rod-guide-side spring bearing 36 and the buffer 39 that are illustrated in FIG. 1 are moved to the rod guide 22 side together with the piston rod 21, and the buffer 39 comes into contact with the rod guide 22 at a predetermined position.

If the piston rod 21 is further moved in a protrusion direction, the buffer 39 and the rod-guide-side spring bearing 36 are stopped with respect to the cylinder 2 after the buffer 39 is crushed. As a result, the piston-side spring bearing 35 that is moved together with the piston rod 21 shortens the length of the rebound spring 38, and biasing force of the rebound spring 38 at this time becomes resistance to the movement of the piston rod 21. In this manner, the rebound spring 38 provided in the cylinder 2 elastically acts on the piston rod 21 so as to control the extension of the piston rod 21. Note that, the rebound spring 38 becomes resistance to the extension of the piston rod 21 so that lifting of vehicle wheels on the inner circumferential side of a vehicle, in which the shock absorber is mounted, at the time of turning is suppressed and thus the rolling amount of the vehicle body is suppressed.

Here, if the piston rod 21 is moved in the protrusion direction and the buffer 39 comes into contact with the rod guide 22, the piston-side spring bearing 35 slightly moves to the flange portion 56 side in the axial direction so as to cause the intermediate body portion 66 to come into contact with the flange portion 56 while deforming the plurality of bias discs 75 and the opening and closing disc 76 with which the pressing portion 67 illustrated in FIG. 2 comes into contact, by the biasing force of the rebound spring 38, before the piston-side spring bearing 35 shortens the length of the rebound spring 38 between the piston-side spring bearing 35 and the rod-guide-side spring bearing 36. In this manner, if the piston-side spring bearing 35 deforms the bias discs 75 and the opening and closing disc 76 by using the pressing portion 67 by the biasing force of the rebound spring 38, the opening and closing portion 83 of the opening and closing disc 76 comes into contact with the contact disc 79. Then, the orifice 88 is closed so that the communication between the upper chamber 19 and the in-rod passage 32 via the passage 89 is blocked.

The piston-side spring bearing 35, the rebound spring 38, and the rod-guide-side spring bearing 36 and the buffer 39 that are illustrated in FIG. 1 configure a spring mechanism 90. The spring mechanism 90 is provided in the cylinder 2, a first end thereof is capable of pressing the opening and closing disc 76 via the bias discs 75 illustrated in FIG. 2, and a second end thereof is capable of coming into contact with the rod guide 22, which is illustrated in FIG. 1, on the end portion side of the cylinder 2. The spring mechanism 90 deforms the bias discs 75 and the opening and closing disc 76 in a valve closing direction by the spring force, against the biasing force of the bias discs 75 and the opening and closing disc 76 illustrated in FIG. 2. The spring mechanism 90, and the opening and closing disc 76 and the contact disc 79 that open and close the orifice 88 configure a passage area adjustment mechanism 91 that adjusts the passage area of the orifice 88, that is, the passage area of the passage 89 according to the biasing force of the rebound spring 38 which is changed according to the position of the piston rod 21. In other words, the orifice 88 is a variable orifice of which the passage area is variable in response to the position of the piston rod 21.

The passage area of the orifice 88 relative to the stroke position of the shock absorber 1, which is changed by the passage area adjustment mechanism 91, has a constant maximum value from the total stroking range on the compression side to a predetermined first position on the extension side including the neutral position (position of 1G (position supporting the vehicle body that is stopped in a horizontal position)). At the first position, if the spring mechanism 90 starts to close the opening and closing disc 76 against the biasing force of the bias discs 75, the passage area becomes proportionally small as being on the extension side. The passage area becomes minimum at a predetermined second position at which the opening and closing portion 83 of the opening and closing disc 76 comes into contact with the contact disc 79, and the passage area has a constant minimum value on the extension side of the second position.

As described in FIG. 3, the piston 18 is configured of a piston main body 95 that is supported by the tip rod 27 and is made of metal, and an annular sliding member 96 that is mounted on the outer circumferential sliding surface of the piston main body 95, performs sliding in the inner tube 3, and is made of a synthetic resin.

The piston main body 95 is provided with a plurality of passages 101 (only one of which is illustrated in FIG. 3 because FIG. 3 illustrates a cross section) through which oil passes from the upper chamber 19 to the lower chamber 20 during the movement of the piston 18 toward the upper chamber 19, that is, the extension stroke; and a plurality of passages 102 (only one of which is illustrated in FIG. 3 because FIG. 3 illustrates a cross section) through which oil passes from the lower chamber 20 to the upper chamber 19 during the movement of the piston 18 toward the lower chamber 20, that is, the compression stroke, the passages 101 and 102 causing the upper chamber 19 to communicate with the lower chamber 20. That is, the plurality of passages 101 and the plurality of passages 102 communicate with the upper chamber 19 and the lower chamber 20 by the movement of the piston 18 so as to cause oil as the operating fluid to flow therethrough.

The passages 101 are formed at equal intervals in the circumferential direction with one passage 102 interposed therebetween, and are opened such that a first side (upper side of FIG. 3) thereof in the axial direction of the piston 18 is toward the outer side in the radial direction and a second side (lower side of FIG. 3) thereof in the axial direction is toward the inner side in the axial direction. A damping force generation mechanism 104 that generates damping force is provided for the passages 101 of a half number of total passages. The damping force generation mechanism 104 is disposed on the lower chamber 20 side which is the first end side of the piston 18 in the axial direction. The passage 101 configures an extension-side passage through which oil passes when the piston 18 is moved on the extension side in which the piston rod 21 extends to the outside of the cylinder 2. The damping force generation mechanism 104 that is provided with respect to such a passage is an extension-side damping force generation mechanism that regulates the flow of oil of the extension-side passage 101 to generate damping force.

In addition, the passage 102 of the other half number of total passages are formed at equal intervals in the circumferential direction with one passage 101 interposed therebetween. The passages 102 are formed such that a second side (lower side of FIG. 3) thereof in the axial direction of the piston 18 is toward the outer side in the radial direction and a first side (upper side of FIG. 3) thereof in the axial direction is toward the inner side in the axial direction. A damping force generation mechanism 105 that generates damping force is provided for the passage 102 of the other half number of total passages. The damping force generation mechanism 105 is disposed on the upper chamber 19 side in an axis direction which is the second end side of the piston 18 in the axial direction. The passage 102 configures a compression-side passage through which oil passes when the piston 18 is moved on the compression side in which the piston rod 21 enters the inside of the cylinder 2. The damping force generation mechanism 105 that is provided with respect to such a passage is a compression-side damping force generation mechanism that regulates the flow of oil of the compression-side passage 102 to generate damping force.

The piston main body 95 is formed into an approximate disc shape, and the center thereof is formed with an insertion hole 106 which passes through the piston main body 95 in the axial direction and into which the holding shaft portion 57 of the tip rod 27 is inserted. An annular seat portion 107 that configures the damping force generation mechanism 104 is formed on the outer side of a first end opening position of the extension-side passage 101 at an end portion of the piston main body 95 on the lower chamber 20 side. An annular seat portion 108 that configures the damping force generation mechanism 105 is formed on the outer side of a first end opening position of the compression-side passage 102 at an end portion of the piston main body 95 on the upper chamber 19 side.

In the piston main body 95, a stepped-shaped portion of which the height in the axis direction is lower than the seat portion 107 is formed on a side of the seat portion 107 opposite to the insertion hole 106. The second end of the compression-side passage 102 is opened in the stepped-shaped portion. Similarly, in the piston main body 95, a stepped-shaped portion of which the height in the axis direction is lower than the seat portion 108 is formed on a side of the seat portion 108 opposite to the insertion hole 106. The second end of the extension-side passage 101 is opened in the stepped-shaped portion.

The extension-side damping force generation mechanism 104 is a pressure control type valve mechanism. The damping force generation mechanism 104 includes, in order from the piston 18 side in the axial direction, a plurality of discs 111, a single contact disc 112, a single valve member 113, a single disc 114, a plurality of discs 115, a single disc 116, a single disc 117, one pilot case 118, a single disc 119, a single disc 120, a single disc 121, a plurality of discs 122, a single disc 123, a single disc 124, and one regulation member 125.

The pilot case 118 is made of metal. The pilot case 118 is formed into a bottomed tubular shape having a perforated disc-shaped bottom 131 along a direction orthogonal to the axis, a cylindrical inner tube 132 that is formed along the axial direction on the inner circumferential side of the bottom 131, and a cylindrical outer tube (tube) 133 that is formed along the axial direction on the outer circumferential side of the bottom 131. The bottom 131 is deviated on the first side in the axial direction with respect to the inner tube 132 and the outer tube 133. A plurality of through holes 134 that pass through the bottom 131 in the axial direction are formed in the bottom 131. On the inner side of the inner tube 132, a small diameter hole portion 135 into which the holding shaft portion 57 of the tip rod 27 is fitted is formed on the bottom 131 side in the axial direction, and a large diameter hole portion 136 having a larger diameter than that of the small diameter hole portion 135 is formed on a side opposite to the bottom 131 in the axial direction. An annular seat portion 137 is formed on an end portion of the outer tube 133 of the pilot case 118, on the bottom 131 side in the axial direction. The disc 119 sits on the seat portion 137.

A space, which is surrounded by the bottom 131, the inner tube 132, and the outer tube 133 of the pilot case 118 and is on a side opposite to the bottom 131 in the axial direction, and the through hole 134 of the pilot case 118 configure a pilot chamber 140 that applies a pressure against the valve member 113 in a direction of the piston 18. The passage hole 51 of the tip rod 27, the large diameter hole portion 136 of the pilot case 118, and an orifice 151, which will be described below, formed on the discs 116 and 117 configure a pilot chamber inflow passage 141 that is connected to the in-rod passage 32 and the pilot chamber 140 to guide a part of the flow of oil to the pilot chamber 140 from the upper chamber 19 and the lower chamber 20 via the in-rod passage 32.

The plurality of discs 111 are made of metal, and are formed into a perforated disc shape which has an outer diameter smaller than that of the seat portion 107 of the piston 18. The contact disc 112 is made of metal, and is formed into a perforated disc shape which has an outer diameter larger than that of the seat portion 107 of the piston 18 and is capable of sitting on the seat portion 107.

The valve member 113 is configured of a disc 145 that is made of metal and is formed into a perforated disc shape having an outer diameter substantially the same as the outer diameter of the contact disc 112; and an annular seal member 146 that is formed of a rubber material and is provided to be fixed, by baking or the like, to the outer circumferential portion of the disc 145 on a rear surface side that is a side opposite to the seat portion 107. The contact disc 112 and the disc 145 of the valve member 113 configure an extension-side damping valve 147 that comes into contact with the seat portion 107 of the piston 18 to be in a closed state, and is separated from the seat portion 107 of the piston 18 to be in an open state. The damping valve 147 forms the pilot chamber 140 together with the pilot case 118. The damping valve 147 is provided between the passage 101 provided in the piston 18 and the pilot chamber 140 provided in the pilot case 118, and suppresses the flow of oil through the passage 101 due to the sliding of the piston 18 toward the extension side to generate damping force. Thus, the damping valve 147 is a disc valve. The opening of the damping valve 147 is suppressed by the pressure of the pilot chamber 140. Note that, no portion passing through in the axial direction is formed in the contact disc 112 and the disc 145, except for the center hole into which the holding shaft portion 57 of the piston rod 21 is inserted.

The seal member 146 of the valve member 113 is slidably fitted into the inner circumferential surface of the outer tube 133 of the pilot case 118 in a liquid-tight manner, and seals a gap between the valve member 113 and the outer tube 133. Thus, the pilot chamber 140 between the valve member 113 and the pilot case 118 causes the internal pressure to act on the damping valve 147 configured of the contact disc 112 and the disc 145 of the valve member 113, in the direction of the piston 18, that is, the valve closing direction in which the contact disc 112 comes into contact with the seat portion 107. The damping valve 147 is a pilot type damping valve having the pilot chamber 140. If the contact disc 112 is separated from the seat portion 107 of the piston 18 so that the damping valve is opened, oil from the passage 101 flows to the lower chamber 20 via a passage 148 along the radial direction between the piston 18 and the pilot case 118.

The disc 114 is made of metal, and is formed into a perforated disc shape having an outer diameter smaller than that of the disc 145. The plurality of discs 115 are made of metal, and are formed into a perforated disc shape having an outer diameter substantially the same as the disc 111. The disc 116 is made of metal, and is formed into a perforated disc shape having an outer diameter substantially the same as the disc 115. A plurality of notches 116A are formed on the outer circumferential side of the disc 116. The disc 117 is made of metal, and is formed into a perforated disc shape having an outer diameter substantially the same as the disc 115. A plurality of notches 117A are formed on the inner circumferential side of the disc 117. The notches 116A of the disc 116 and the notches 117A of the disc 117 communicate with each other to form the orifice 151. As described above, the inside of the large diameter hole portion 136 of the pilot case 118 and the pilot chamber 140 communicate with each other by the orifice 151.

The disc 119 is made of metal. The disc 119 is formed into a perforated disc shape which has an outer diameter larger than that of the seat portion 137 of the pilot case 118 and is capable of sitting on the seat portion 137. In the disc 119, a plurality of notches 119A are formed on the outer circumferential side, and a through hole 119B connected to the notches 119A is formed on the intermediate portion in the radial direction. The disc 120 is made of metal, and has an outer diameter substantially the same as that of the disc 119. A through hole 120A is formed on the intermediate portion of the disc 120 in the radial direction. The disc 121 has an outer diameter substantially the same as that of the disc 119. A plurality of notches 121A are formed on the outer circumferential side of the disc 121. Each of the plurality of discs 122 has an outer diameter substantially the same as that of the disc 119.

The discs 119 to 122 and the seat portion 137 configure a disc valve 153 that suppresses the flow of oil between the pilot chamber 140 provided in the pilot case 118 and the lower chamber 20. The notches 119A and the through hole 119B of the disc 119, the through hole 120A of the disc 120, and the notches 121A of the disc 121 form an orifice 154 that causes the pilot chamber 140 to communicate with the lower chamber 20 even in a state where the disc 119 is in contact with the seat portion 137. The disc valve 153 causes the pilot chamber 140 to communicate with the lower chamber 20 with a passage area wider than that of the orifice 154 when the disc 122 is separated from the disc 121 or when the disc 119 is separated from the seat portion 137. The disc 124 is in contact with the regulation member 125 having high rigidity, and comes into contact with the disc 122 when the disc valve 153 is deformed in a valve opening direction so as to regulate the deformation of the disc valve 153 more than a prescribed amount.

Similar to the extension side, the compression-side damping force generation mechanism 105 is a pressure control type valve mechanism. The damping force generation mechanism 105 includes, in order from the piston 18 side in the axial direction, a plurality of discs 161, a single contact disc 162, a single valve member 163, a single disc 164, a plurality of discs 165, a single disc 166, a single disc 167, one pilot case 168, a single disc 169, a single disc 170, a single disc 171, a plurality of discs 172, a single disc 173, and a plurality of discs 174.

The pilot case 168 is a common component with the pilot case 118 described above. The pilot case 168 is formed into a bottomed tubular shape having a perforated disc-shaped bottom 181 along a direction orthogonal to the axis, a cylindrical inner tube 182 that is formed along the axial direction on the inner circumferential side of the bottom 181, and a cylindrical outer tube (tube) 183 that is formed along the axial direction on the outer circumferential side of the bottom 181. The bottom 181 is deviated on the second side in the axial direction with respect to the inner tube 182 and the outer tube 183. A plurality of through holes 184 that pass through the bottom 181 in the axial direction are formed in the bottom 181. On the inner side of the inner tube 182, a small diameter hole portion 185 into which the holding shaft portion 57 of the tip rod 27 is fitted is formed on the bottom 181 side in the axial direction, and a large diameter hole portion 186 having a larger diameter than that of the small diameter hole portion 185 is formed on a side opposite to the bottom 181 in the axial direction. An annular seat portion 187 is formed on an end portion of the outer tube 183 of the pilot case 168, on the bottom 181 side in the axial direction, and the disc 169 sits on the seat portion 187.

A space, which is surrounded by the bottom 181, the inner tube 182, and the outer tube 183 of the pilot case 168 and is on a side opposite to the bottom 181 in the axial direction, and the through hole 184 of the pilot case 168 configure a pilot chamber 190 that applies a pressure against the valve member 163 in a direction of the piston 18. The passage hole 50 of the tip rod 27, the large diameter hole portion 186 of the pilot case 168, and an orifice 201, which will be described below, formed on the discs 166 and 167 configure a pilot chamber inflow passage 191 that is connected to the in-rod passage 32 and the pilot chamber 190 to guide a part of the flow of oil to the pilot chamber 190 from the upper chamber 19 and the lower chamber 20 via the in-rod passage 32.

The plurality of discs 161 are made of metal, and are formed into a perforated disc shape which has an outer diameter smaller than that of the seat portion 108 of the piston 18. The contact disc 162 is a common component with the contact disc 112. The contact disc 162 is formed into a perforated disc shape which has an outer diameter larger than that of the seat portion 108 of the piston 18 and is capable of sitting on the seat portion 108.

The valve member 163 is a common component with the valve member 113 described above. The valve member 163 is configured of a disc 195 that is formed into a perforated disc shape having an outer diameter substantially the same as the outer diameter of the contact disc 162; and an annular seal member 196 that is formed of a rubber material and is provided to be fixed to the outer circumferential portion of the disc 195 on a rear surface side that is a side opposite to the seat portion 108. The contact disc 162 and the disc 195 of the valve member 163 configure a compression-side damping valve 197 that comes into contact with the seat portion 108 of the piston 18 to be in a closed state, and is separated from the seat portion 108 of the piston 18 to be in an open state. The damping valve 197 forms the pilot chamber 190 together with the pilot case 168. The damping valve 197 is provided between the passage 102 provided in the piston 18 and the pilot chamber 190 provided in the pilot case 168, and suppresses the flow of oil through the passage 102 due to the sliding of the piston 18 toward the compression side to generate damping force. Thus, the damping valve 197 is a disc valve. The opening of the damping valve 197 is suppressed by the pressure of the pilot chamber 190. Note that, no portion passing through in the axial direction is formed in the contact disc 162 and the disc 195, except for the center hole into which the holding shaft portion 57 of the piston rod 21 is inserted.

The seal member 196 of the valve member 163 is slidably fitted into the inner circumferential surface of the outer tube 183 of the pilot case 168 in a liquid-tight manner, and seals a gap between the valve member 163 and the outer tube 183. Thus, the pilot chamber 190 between the valve member 163 and the pilot case 168 causes the internal pressure to act on the damping valve 197 configured of the contact disc 162 and the disc 195 of the valve member 163, in the direction of the piston 18, that is, the valve closing direction in which the contact disc 162 comes into contact with the seat portion 108. The damping valve 197 is a pilot type damping valve having the pilot chamber 190. If the contact disc 162 is separated from the seat portion 108 of the piston 18 so that the damping valve is opened, the damping valve 197 causes oil from the passage 102 to flow to the upper chamber 19 via a passage 198 along the radial direction between the piston 18 and the pilot case 168.

The disc 164 is made of metal, and is formed into a perforated disc shape having an outer diameter smaller than that of the disc 195. The plurality of discs 165 are made of metal, and are formed into a perforated disc shape having an outer diameter substantially the same as the disc 161. The disc 166 is made of metal, and is formed into a perforated disc shape having an outer diameter substantially the same as the disc 165. A plurality of notches 166A are formed on the outer circumferential side of the disc 166. The disc 167 is formed into a perforated disc shape having an outer diameter substantially the same as the disc 166, and a plurality of notches 167A are formed on the inner circumferential side of the disc 167. The notches 166A of the disc 166 and the notches 167A of the disc 167 communicate with each other to form the orifice 201. As described above, the inside of the large diameter hole portion 186 of the pilot case 168 and the pilot chamber 190 communicate with each other by the orifice 201.

The disc 169 is made of metal, and is formed into a perforated disc shape which has an outer diameter larger than that of the seat portion 187 of the pilot case 168 and is capable of sitting on the seat portion 187. In the disc 169, a plurality of notches 169A are formed on the outer circumferential side, and a through hole 169B connected to the notches 169A is formed on the intermediate portion in the radial direction. The disc 170 is made of metal, and has an outer diameter substantially the same as that of the disc 169. A through hole 170A is formed on the intermediate portion of the disc 170 in the radial direction. The disc 171 is made of metal, and has an outer diameter substantially the same as that of the disc 169. A plurality of notches 171A are formed on the outer circumferential side of the disc 171. Each of the plurality of discs 172 is made of metal, and has an outer diameter substantially the same as that of the disc 169.

The discs 169 to 172 and the seat portion 187 configure a disc valve 203 that suppresses the flow of oil between the pilot chamber 190 provided in the pilot case 168 and the upper chamber 19. The notches 169A and the through hole 169B of the disc 169, the through hole 170A of the disc 170, and the notches 171A of the disc 171 form an orifice 204 that causes the pilot chamber 190 to communicate with the upper chamber 19 even in a state where the disc 169 is in contact with the seat portion 187. The disc valve 203 causes the pilot chamber 190 to communicate with the upper chamber 19 with a passage area wider than that of the orifice 204 when the disc 172 is separated from the disc 171 or when the disc 169 is separated from the seat portion 187. The plurality of discs 174 come into contact with the disc 172 when the discs 169 to 172 are deformed in a valve opening direction so as to regulate the deformation of the discs 169 to 172 more than a prescribed amount.

The nut 210 is screwed with the male screw 61 at the tip of the tip rod 27. The nut 210 is fastened by the male screw 61 so as to sandwich the plurality of discs 73, the disc 74, the plurality of bias discs 75, the opening and closing disc 76, the intermediate disc 77, the intermediate disc 78, the contact disc 79, the passage forming member 80, the plurality of discs 174, the disc 173, the plurality of discs 172, the disc 171, the disc 170, and the disc 169 illustrated in FIG. 2; the pilot case 168, the disc 167, the disc 166, the plurality of discs 165, the disc 164, the valve member 163, the contact disc 162, the plurality of discs 161, the piston 18, the plurality of discs 111, the contact disc 112, the valve member 113, the disc 114, the plurality of discs 115, the disc 116, the disc 117, the pilot case 118, the disc 119, the disc 120, the disc 121, the plurality of discs 122, the disc 123, the disc 124, and the regulation member 125 illustrated in FIG. 3, between the nut 210 and the flange portion 56 of the tip rod 27 illustrated in FIG. 2.

In this state, the inner circumferential side of the damping valve 147 configured of the disc 145 and the contact disc 112 is clamped by the disc 114 and the discs 111. Accordingly, if the outer circumferential side of the damping valve 147 sits on the seat portion 107, the passage 101 is closed, and if the outer circumferential side of the damping valve 147 is separated from the seat portion 107, the passage 101 is opened. Similarly, the inner circumferential side of the damping valve 197 configured of the disc 195 and the contact disc 162 is clamped by the disc 164 and the discs 161. Accordingly, if the outer circumferential side of the damping valve 197 sits on the seat portion 108, the passage 102 is closed, and if the outer circumferential side of the damping valve 197 is separated from the seat portion 108, the passage 102 is opened.

As described in FIG. 1, the metering pin 31 includes a supporting flange portion 220 supported by the base valve 25; a large diameter axial portion 222 that has a smaller diameter than that of the supporting flange portion 220 and extends in the axial direction from the supporting flange portion 220; a tapered axial portion 223 that extends in the axial direction from a side of the large diameter axial portion 222 opposite to the supporting flange portion 220; and a small diameter axial portion 224 that extends in the axial direction from a side of the tapered axial portion 223 opposite to the large diameter axial portion 222. The large diameter axial portion 222 has a constant diameter, and the small diameter axial portion 224 has a constant diameter smaller than that of the large diameter axial portion 222.

The metering pin 31 is inserted into the insertion hole 30 of the piston rod 21. The metering pin 31 forms the in-rod passage 32 between the metering pin 31 and the insertion hole 30 of the piston rod 21. As described in FIG. 3, a gap between the metering pin 31 and the small diameter hole portion 48 that is positioned on the first end side of the piston rod 21 in the cylinder 2 configures an orifice 225 that causes the in-rod passage 32 to communicate with the lower chamber 20.

The passage 89 including the orifice 88 illustrated in FIG. 2 and the in-rod passage 32 including the orifice 225 illustrated in FIG. 3 communicate with each other so as to cause the operating fluid to flow between the upper chamber 19 and the lower chamber 20 by the movement of the piston 18.

The passage area of the orifice 225 becomes minimum when the large diameter axial portion 222 of the metering pin 31 and the small diameter hole portion 48 are positioned to be aligned in the axial direction. In addition, the passage area of the orifice 225 becomes maximum when the small diameter axial portion 224 of the metering pin 31 and the small diameter hole portion 48 are positioned to be aligned in the axial direction. Furthermore, the orifice 225 is configured the passage area is gradually increased toward the small diameter axial portion 224 of the tapered axial portion 223 when the tapered axial portion 223 of the metering pin 31 and the small diameter hole portion 48 are positioned to be aligned in the axial direction. In other words, the orifice 225 is a variable orifice of which the passage area is variable in response to the position of the piston rod 21.

The small diameter hole portion 48 disposed on the first end side of the piston rod 21 in the cylinder 2, and the metering pin 31 include the orifice 225 and configure a passage area adjustment mechanism 227 that adjusts the passage area of the orifice 225 by using the position of the piston rod 21 with respect to the cylinder 2. In other words, the passage area adjustment mechanism 227 adjusts the passage area of the orifice 225 by using the metering pin 31.

By the passage area adjustment mechanism 227, the passage area of the orifice 225 with respect to the stroke position of the shock absorber 1 has a constant minimum value further on the compression side than a predetermined compression-side third position by positioning the small diameter hole portion 48 and the large diameter axial portion 222 to be aligned in the axial direction. From the third position up to an extension-side fourth position including the 1G position, the passage area of the orifice 225 is increased as the orifice is toward the extension side by positioning the small diameter hole portion 48 and the tapered axial portion 223 to be aligned in the axial direction. From the fourth position to the extension side, the passage area of the orifice 225 has a constant maximum value by positioning the small diameter hole portion 48 and the small diameter axial portion 224 to be aligned in the axial direction.

As described in FIG. 1, the base valve 25 is provided between the bottom member 8 of the outer tube 4 and the inner tube 3. The base valve 25 includes a vase valve member 231 that partitions between the lower chamber 20 and the reservoir chamber 6; a disc 232 provided on the lower side of the vase valve member 231, that is, on the reservoir chamber 6 side; a disc 233 provided on the upper side of the vase valve member 231, that is, on the lower chamber 20 side; an attachment pin 234 that attaches the disc 232 and the disc 233 to the vase valve member 231; a locking member 235 mounted on the outer circumferential side of the vase valve member 231; and a supporting plate 236 that supports the supporting flange portion 220 of the metering pin 31. The attachment pin 234 sandwiches the center side of the disc 232 and the disc 233 in the radial direction between the attachment pin and the vase valve member 231.

The vase valve member 231 is formed into an annular shape such that the attachment pin 234 is inserted into the center of the vase valve member 231 in the radial direction. The vase valve member 231 is formed with a plurality of passage holes 239 that cause oil to flow between the lower chamber 20 and the reservoir chamber 6; and a plurality of passage holes 240 that are on the outer side of the passage holes 239 in the radial direction and cause oil to flow between the lower chamber 20 and the reservoir chamber 6. The disc 232 on the reservoir chamber 6 side allows the flow of oil from the lower chamber 20 to the reservoir chamber 6 via the passage holes 239 on the inner side, and meanwhile, regulates the flow of oil from the reservoir chamber 6 to the lower chamber 20 via the passage holes 239 on the inner side. The disc 233 allows the flow of oil from the reservoir chamber 6 to the lower chamber 20 via the passage holes 240 on the outer side, and meanwhile, regulates the flow of oil from the lower chamber 20 to the reservoir chamber 6 via the passage holes 240 on the outer side.

The disc 232 and the vase valve member 231 configure a compression-side damping valve 242 that is opened during the compression stroke of the shock absorber 1 to cause oil to flow from the lower chamber 20 to the reservoir chamber 6, and generates damping force. The disc 233 and the vase valve member 231 configure a suction valve 243 that is opened during the extension stroke of the shock absorber 1 to cause oil to flow from the reservoir chamber 6 to the lower chamber 20. The suction valve 243 mainly performs a function of causing liquid to flow from the reservoir chamber 6 to the lower chamber 20 without substantially generating damping force so as to supplement the shortage of liquid that is generated when the piston rod 21 extends from the cylinder 2.

The locking member 235 is formed into a tubular shape, and the vase valve member 231 is fitted into the inner side thereof. The vase valve member 231 is fitted into the inner circumferential portion of the lower end of the inner tube 3 via the locking member 235. A locking flange portion 245 that extends to the inner side in the radial direction is formed in an end portion of the locking member 235 on the piston 18 side. In the supporting plate 236, the outer circumferential portion is locked to a side of the locking flange portion 245 opposite to the piston 18, and the inner circumferential portion is locked to the supporting flange portion 220 of the metering pin 31 on the piston 18 side. In this manner, the locking member 235 and the supporting plate 236 hold the supporting flange portion 220 of the metering pin 31 in a state where the supporting flange portion 220 is in contact with the attachment pin 234.

Figure 4:
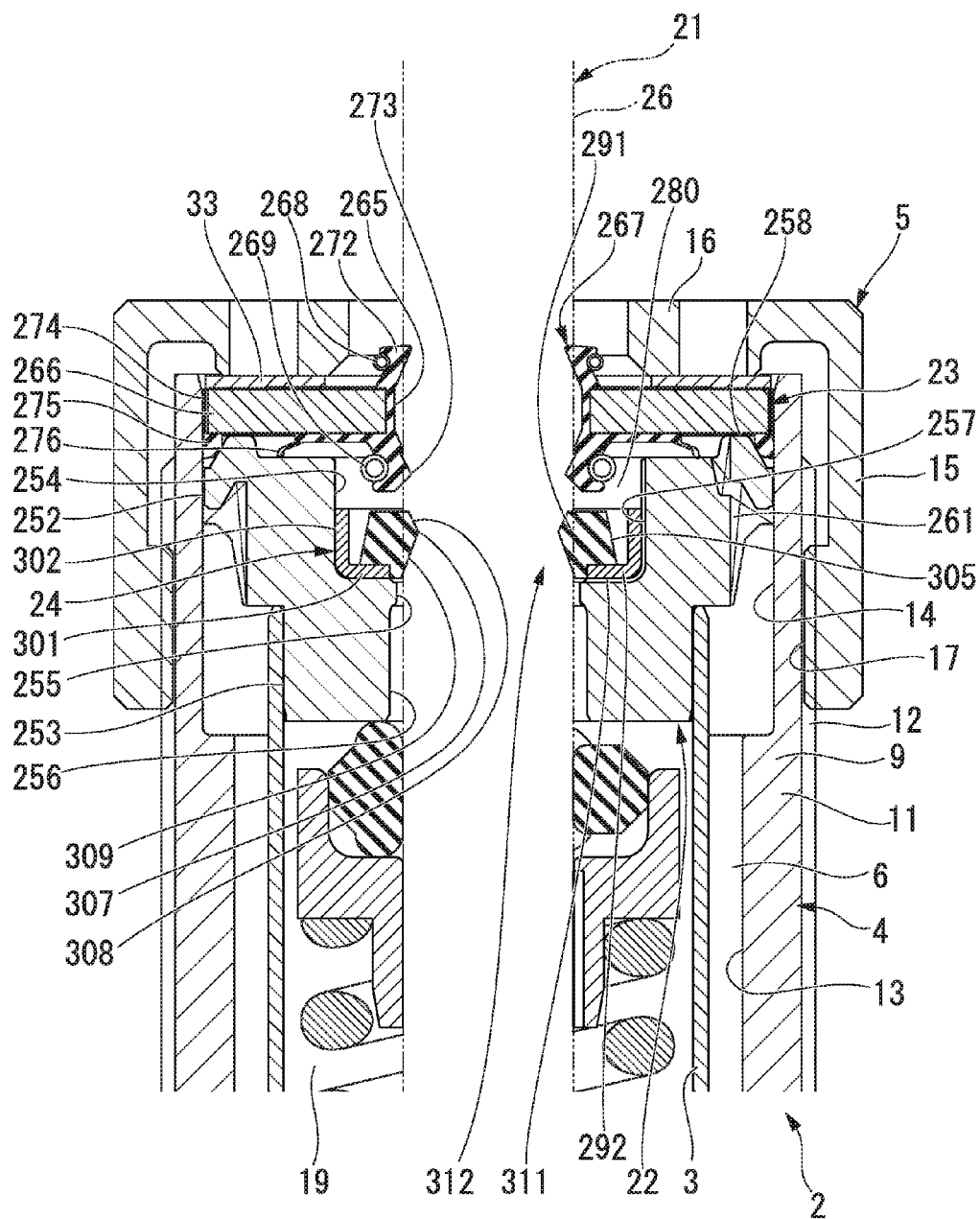
FIG. 4 is a partial enlarged sectional view illustrating the periphery of a rod guide of the shock absorber according to the embodiment of the invention.

As described in FIG. 4, the rod guide 22 has an outer shape in which a large outer diameter portion 252 is formed on the first side in the axial direction and a small outer diameter portion 253 having a smaller diameter than that of the large outer diameter portion 252 is formed on the second side in the axial direction. The rod guide 22 is a sintered component, the large outer diameter portion 252 of the rod guide 22 is fitted into the large diameter inner circumferential portion 14 of the mouthpiece member 9 of the outer tube 4, and the small outer diameter portion 253 thereof is fitted into the inner circumferential portion of the inner tube 3.

A large diameter hole portion 254, an intermediate hole portion 255, and the small diameter portion 256 are formed in the center of the rod guide 22 in the radial direction. The large diameter hole portion 254 is formed on the large outer diameter portion 252 side of the rod guide 22 in the axial direction. The intermediate hole portion 255 has a smaller diameter than that of the large diameter hole portion 254, and is formed on the small outer diameter portion 253 rather than that of the large diameter hole portion 254 of the rod guide 22 in the axial direction. The small diameter portion 256 has a diameter smaller than that of the large diameter hole portion 254 and slightly larger than that of the intermediate hole portion 255, and is formed on a side of the intermediate hole portion 255 opposite to the large diameter hole portion 254 of the rod guide 22 in the axial direction.

A communication groove 257 is formed on the large diameter hole portion 254 so as to be continuous from the inner circumferential surface to the bottom surface. The communication groove 257 is formed over the entire length of the inner circumferential surface of the large diameter hole portion 254 in the axial direction, and is formed over the entire length of the bottom surface of the large diameter hole portion 254 in the radial direction.

An annular convex portion 258 is formed in an end surface of the rod guide 22 in the large outer diameter portion 252 side in the axial direction. The annular convex portion 258 is formed to protrude toward the outside in the axial direction from the end portion of the rod guide 22 on the large outer diameter portion 252 side in the axial direction. A communication hole 261 is formed in the rod guide 22 on the inner side of the annular convex portion 258. The communication hole 261 passes through the large outer diameter portion 252 of the rod guide 22 in the axial direction, and communicates with the reservoir chamber 6 between the outer tube 4 and the inner tube 3.

The seal member 23 is disposed in the first end portion of the cylinder 2 in the axial direction, and the inner circumferential portion thereof is in press contact with the outer circumferential portion of the rod main body 26 of the piston rod 21. The inner circumferential portion of the seal member 23 is in sliding contact with the outer circumferential portion of the piston rod 21 that moves in the axial direction so as to prevent the oil in the inner tube 3 and high pressure gas and oil in the reservoir chamber 6 in the outer tube 4 from leaking to the outside from a gap between the rod guide 22 and the piston rod 21 and a gap between the rod guide 22 and the outer tube 4. In FIG. 4, the piston rod 21 is illustrated by an imaginary line (two-dot chain line), and the seal member 23 is illustrated in a natural state before the piston rod 21 is inserted (which does not mean that the seal member 23 makes an inroad into the piston rod 21).

The seal member 23 is configured of a seal member main body 267 that is an integrally molded article configured of a seal portion 265 and an annular member 266 having an annular shape; an annular spring 268; and an annular spring 269. The seal portion 265 is formed of an elastic rubber material having favorable sliding properties, such as nitrile rubber and fluoro rubber. The annular member 266 is a member for maintaining the shape of the seal member 23 by being buried in the seal portion 265 and for obtaining strength for the fixing, and is made of metal.

The seal portion 265 includes an annular tube-shaped dust lip 272 and an annular tube-shaped oil lip 273 on the inner side in the radial direction thereof. The dust lip 272 extends from the outside of the cylinder inside-outside direction on the inner circumferential side of the annular member 266 to a direction of separating from the annular member 266 along the axial direction. The oil lip 273 extends from the inside of the cylinder inside-outside direction on the inner circumferential side of the annular member 266 to the direction of separating from the annular member 266 along the axial direction. The spring 268 is fitted into the outer circumferential portion of the dust lip 272, and the spring 269 is fitted into the outer circumferential portion of the oil lip 273.

In addition, the seal portion 265 includes an outer circumferential seal 274 and an annular seal lip 275 on the outer side in the radial direction thereof. The outer circumferential seal 274 covers the outer circumferential surface of the annular member 266.

The seal lip 275 extends from the outer circumferential seal 274 to the inside of the cylinder inside-outside direction. Furthermore, the seal portion 265 includes an annular check lip 276. The check lip 276 extends from the inside of the cylinder inside-outside direction of the intermediate portion of the seal portion 265 in the radial direction to the inside of the cylinder inside-outside direction while increasing its diameter.

In a natural state, the dust lip 272 is formed into a tapered tubular shape as a whole in which the inner diameter is decreased as the dust lip is separated from the annular member 266 to the outside of the cylinder inside-outside direction. The outer circumferential portion of the dust lip 272 has a shape recessed inward in the radial direction, and the spring 268 is fitted into the recessed portion.

In a natural state, the oil lip 273 is formed into a tapered tubular shape as a whole in which the inner diameter is decreased as the oil lip is separated from the annular member 266 to the inside of the cylinder inside-outside direction. The outer circumferential portion of the oil lip 273 has a shape recessed inward in the radial direction, and the spring 269 is fitted into the recessed portion. The inner circumferential portion of the oil lip 273 is formed into a stepped shape.

In a state where the dust lip 272 is disposed on the outside of the cylinder inside-outside direction and the oil lip 273 is disposed on the inside of the cylinder inside-outside direction, the outer circumferential seal 274 of the seal member 23 is in a sealing contact with the large diameter inner circumferential portion 14 of the mouthpiece member 9 of the outer tube 4. In this state, in the seal member 23, the position of the annular member 266 of the seal portion 265 is sandwiched between the annular convex portion 258 of the rod guide 22 and the inner flange portion 16 of the cover 5. At this time, in the seal member 23, the seal lip 275 is disposed between the annular convex portion 258 of the rod guide 22 and the large diameter inner circumferential portion 14 of the mouthpiece member 9 of the outer tube 4, and is in sealing contact therewith. In addition, the oil lip 273 is disposed in the large diameter hole portion 254 of the rod guide 22.

The rod main body 26 of the piston rod 21 is inserted into the inner side of the dust lip 272 and the oil lip 273 of the seal member 23 in a state in which the seal member 23 is attached to the cylinder 2. In this state, the first end of the piston rod 21 protrudes from the first end of the cylinder 2. In addition, in this state, the dust lip 272 is provided on the first end side of the cylinder 2 where the piston rod 21 protrudes, and the oil lip 273 is provided on the inside of the cylinder inside-outside direction of the dust lip 272.

The spring 268 fitted into the dust lip 272 is a member for maintaining fastening force in a close-contact direction of the dust lip 272 toward the piston rod 21, in a constant state. In addition, the spring 268 is also used for adjusting the fastening force in order to satisfy a design specification. The spring 269 fitted into the oil lip 273 adjusts fastening force in a close-contact direction of the oil lip 273 toward the piston rod 21.

The check lip 276 of the seal portion 265 on the rod guide 22 side is configured to be capable of being in sealing contact with a portion further on the inner side than the annular convex portion 258 of the rod guide 22 over the entire circumference thereof with a predetermined fastening interference. Here, oil leaking from the gap between the rod guide 22 and the piston rod 21 is accumulated in a chamber 280 formed by mainly the large diameter hole portion 254 that is further on the gap side than the check lip 276 if the seal member 23. The check lip 276 is opened when the pressure of the chamber 280 is higher by a predetermined amount than the pressure of the reservoir chamber 6 so as to cause the oil accumulated in the chamber 280 to flow to the reservoir chamber 6 via the communication hole 261. That is, the check lip 276 functions as a check valve for allowing the flow of oil and gas only in a direction from the chamber 280 to the reservoir chamber 6 and for regulating the flow thereof in an opposite direction.

The seal member 23 holds sealing properties by the dust lip 272 being in close contact with the piston rod 21 by the interference thereof and the radial load of the spring 268. The seal member 23 regulates the entrance of foreign substances, which are attached to the piston rod 21 when the piston rod 21 is exposed to the outside, to the inside by using mainly the dust lip 272. The seal member 23 holds sealing properties by the oil lip 273 being in close contact with the piston rod 21 by the interference thereof and the radial load of the spring 269. The seal member 23 regulates the leakage of oil, which is attached to the piston rod 21 when the piston rod 21 enters the inner tube 3, to the outside of the piston rod 21 by using mainly the oil lip 273.

The friction member 24 is fitted on the bottom side in the large diameter hole portion 254 of the rod guide 22. Accordingly, the friction member 24 is disposed further on the inner side of the cylinder 2 than the seal member 23. The inner circumferential portion of the friction member 24 is in press contact with the outer circumferential portion of the rod main body 26 of the piston rod 21, and generates frictional resistance against the piston rod 21. In FIG. 4, the piston rod 21 is illustrated by an imaginary line (two-dot chain line), and the friction member 24 is illustrated in a natural state before the piston rod 21 is inserted (which does not mean that the friction member 24 makes an inroad into the piston rod 21).

The friction member 24 is an integrally molded article configured of an annular elastic rubber portion 291 and an annular base portion 292. The elastic rubber portion 291 is formed of an elastic rubber material such as nitrile rubber and fluoro rubber, and is fixed to the base portion 292. The base portion 292 is made of metal, and is a member for maintaining the shape of the elastic rubber portion 291 and for obtaining strength for the fixing to the rod guide 22.

The base portion 292 of the friction member 24 is configured of a bottom 301 and a tube 302. The bottom 301 is formed into a perforated disc shape. The tube 302 is formed into a cylindrical shape of extending from the outer circumferential side of the bottom 301 in the axial direction. The central axes of the bottom 301 and the tube 302 coincide with each other. In other words, the tube 302 vertically extends in relation to the bottom 301.

The elastic rubber portion 291 is formed into an annular shape of which the central axis coincides with that of the base portion 292. The elastic rubber portion 291 covers the inner circumferential surface of the bottom 301 of the base portion 292, and the bottom 301 on the tube 302 side in the axial direction, and is provided to extend from the bottom 301 to the tube 302 side in the axial direction. In a natural state, the elastic rubber portion 291 is separated from the tube 302 in the radial direction, and includes a tapered surface 305 of which the diameter is increased as the outer circumferential side facing the tube 302 is toward the bottom 301 side in the axial direction. In a natural state, the elastic rubber portion 291 includes a minimum inner diameter portion 307, a diameter increasing portion 308, and a diameter increasing portion 309 on the inner circumferential surface thereof. The minimum inner diameter portion 307 is formed to have the minimum inner diameter in the friction member 24. The diameter increasing portion 308 is on a side of the minimum inner diameter portion 307 opposite to the bottom 301 in the axial direction, and is formed into a tapered shape of which the diameter is increased as the diameter increasing portion 308 is separated from the minimum inner diameter portion 307. The diameter increasing portion 309 is on the bottom 301 side of the minimum inner diameter portion 307 in the axial direction, and is formed into a tapered shape of which the diameter is increased as the diameter increasing portion 309 is separated from the minimum inner diameter portion 307. In other words, the elastic rubber portion 291 is provided with the minimum inner diameter portion 307 and the diameter increasing portions 308 and 309, which are on both sides of the minimum inner diameter portion 307 in the axial direction, on the inner circumferential side. The boundary between the diameter increasing portions 308 and 309 is the minimum inner diameter portion 307. In a natural state, in the elastic rubber portion 291, the axial length of the diameter increasing portion 309 between the minimum inner diameter portion 307 and the bottom 301 is longer than the axial length of the diameter increasing portion 308.

In a state where the tube 302 side of the base portion 292 in the axial direction is disposed on the outside of the cylinder inside-outside direction and the bottom 301 of the base portion 292 in the axial direction is disposed on the inside of the cylinder inside-outside direction, the friction member 24 having a structure described above is press fitted into the large diameter hole portion 254 of the rod guide 22. At this time, the bottom 301 of the base portion 292 of the friction member 24 is in contact with the bottom surface of the large diameter hole portion 254.

Then, in the friction member 24 in a state of being attached to the cylinder 2, the rod main body 26 of the piston rod 21 is inserted into the inside of the elastic rubber portion 291 with a predetermined interference. In this manner, the elastic rubber portion 291 of the friction member 24 is in close contact with the rod main body 26 of the piston rod 21 while being elastically deformed to the outside in the radial direction. Then, if the piston rod 21 is moved in the cylinder inside-outside direction, the elastic rubber portion 291 is in sliding contact with the rod main body 26. At this time, the friction member 24 adjusts friction characteristic.

In a state into which the friction member 24 is fitted, a communication passage 311 is formed by the communication groove 257 formed on the large diameter hole portion 254, between the large diameter hole portion 254 of the rod guide 22 and the friction member 24. The communication passage 311 causes the small diameter portion 256 side of the rod guide 22 to communicate with the large diameter hole portion 254 side, that is, the chamber 280 side. The small diameter portion 256 side of the rod guide 22 communicates with the upper chamber 19 via the piston rod 21. In this manner, the communication passage 311 causes the chamber 280 to communicate with the upper chamber 19 so as to decrease the differential pressure thereof. In other words, the communication passage 311 causes the opposite sides of the friction member 24 in the axial direction to communicate with each other so as to decrease the differential pressure of the opposite sides of the friction member 24 in the axial direction. Thus, the friction member 24 is not a member for actively playing a role as a seal. The friction member 24 and the communication passage 311 configure a damping force generation mechanism 312 that generates damping force to the shock absorber 1 by the friction member 24 becoming the sliding resistance of the piston rod 21.

Instead of the communication passage 311 or in addition to the communication passage 311, a communication passage for decreasing the differential pressure of the opposite side of the friction member 24 in the axial direction may be provided on the inner circumference of the friction member 24. The communication passage 311 may not perform communication all the time, for example, a check valve from the inside of the cylinder 2 to the outside may be provided. The point is that the friction member 24 is preferably a friction member that does not act as a perfect seal.

The operation of the shock absorber 1 of the embodiment will be described. The shock absorber 1 of the embodiment has a position-sensitive function in which the damping force is changed according to the stroke position by being provided with the passage area adjustment mechanisms 91 and 227.

In a maximum-length-side predetermined range in which the piston rod 21 extends further to the outer side of the cylinder 2 than a maximum-length-side predetermined position, the buffer 39 illustrated in FIG. 1 is in contact with the rod guide 22, and the length of the spring mechanism 90 including the rebound spring 38 is shortened. Accordingly, the passage area adjustment mechanism 91 elastically deforms the bias discs 75 and the opening and closing disc 76 by the piston-side spring bearing 35 of the spring mechanism 90 illustrated in FIG. 2 so that the opening and closing disc 76 comes into contact with the contact disc 79, and thus the passage 89 is closed. In addition, in the maximum-length-side predetermined range, the passage area adjustment mechanism 227 illustrated in FIG. 3 positions the small diameter hole portion 48 to be aligned with the small diameter axial portion 224 of the metering pin 31 in the axial direction so as to cause the passage area of the orifice 225 to become maximum. In the maximum-length-side predetermined range, the in-rod passage 32 communicates with the lower chamber 20 in the passage area of the orifice 225, and the pilot chamber 140 of the extension-side damping force generation mechanism 104 and the pilot chamber 190 of the compression-side damping force generation mechanism 105 communicate with the lower chamber 20 via the in-rod passage 32 including the orifice 225 and the pilot chamber inflow passages 141 and 191.

In the maximum-length-side predetermined range, during the extension stroke in which the piston rod 21 extends to the outside of the cylinder 2, the piston 18 is moved to the upper chamber 19 side, the pressure of the upper chamber 19 is increased, and the pressure of the lower chamber 20 is decreased. Then, the pressure of the upper chamber 19 acts on the disc 145 and the contact disc 112 of the damping valve 147 of the extension-side damping force generation mechanism 104 via the extension-side passage 101 formed in the piston 18. At this time, since the pilot chamber 140 that applies the pilot pressure in a direction of the seat portion 107 against the damping valve 147 communicates with the lower chamber 20 via the in-rod passage 32 including the orifice 225, and the pilot chamber inflow passage 141, the pilot chamber 140 has a pressure close to that of the lower chamber 20, and the pilot pressure is decreased. Accordingly, the differential pressure acting on the damping valve 147 is increased, and thus the damping valve 147 is relatively easily opened to be separated from the seat portion 107, thereby causing oil to flow to the lower chamber 20 side via the passage 148 along the radial direction between the piston 18 and the pilot case 118. In this manner, the damping force is decreased. That is, the extension-side damping force is in a soft state.

In addition, in the maximum-length-side predetermined range, during the compression stroke in which the piston rod 21 enters the inside of the cylinder 2, the piston 18 is moved to the lower chamber 20 side, the pressure of the lower chamber 20 is increased, and the pressure of the upper chamber 19 is decreased. Then, the hydraulic pressure of the lower chamber 20 acts on the disc 195 and the contact disc 162 of the damping valve 197 of the compression-side damping force generation mechanism 105 via the compression-side passage 102 formed in the piston 18. At this time, since the pilot chamber 190 that applies the pilot pressure in a direction of the seat portion 108 against the damping valve 197 communicates with the lower chamber 20 via the in-rod passage 32 including the orifice 225, and the pilot chamber inflow passage 191, the pilot chamber 190 has a pressure close to that of the lower chamber 20, and thus the pressure of the lower chamber 20 and the pilot pressure are increased.

In this state, since the pressure increase of the pilot chamber 190 can follow the pressure increase of the lower chamber 20 when the piston speed is slow, the differential pressure acting on the damping valve 197 is decreased, and thus the damping valve 197 becomes difficult to be separated from the seat portion 108. Thus, the oil from the lower chamber 20 passes through the in-rod passage 32 including the orifice 225, the pilot chamber 190, and the pilot chamber inflow passage 191, and flows to the upper chamber 19 via the orifice 204 of the disc valve 203, and thereby damping force having orifice characteristics (the damping force is approximately proportional to the square of the piston speed) is generated. Therefore, the characteristics of the damping force relative to the piston speed are that the rate of the increase of the damping force relative to the increase of the piston speed becomes high.

Even when the piston speed is fast, the damping valve 197 becomes difficult to be separated from the seat portion 108. Therefore, the oil from the lower chamber 20 passes through the in-rod passage 32 including the orifice 225, the pilot chamber 190, and the pilot chamber inflow passage 191, and flows to the upper chamber 19 via the seat portion 187 and the discs 169 to 172 while opening the disc valve 203. Thereby, damping force having valve characteristics (the damping force is approximately proportional to the piston speed) is generated. Therefore, the characteristics of the damping force relative to the piston speed are that the rate of the increase of the damping force relative to the increase of the piston speed is slightly decreased.

In this manner, the damping force during the compression stroke becomes higher than the damping force during the extension stroke, and the compression-side damping force is in a hard state.

In addition, even during the compression stroke in the maximum-length-side predetermined range, in a case of generating impact shock due to a difference in level of the road surface or the like, if the piston speed is further increased, the pressure increase of the pilot chamber 190 cannot follow the pressure increase of the lower chamber 20. Therefore, the relationship of force due to the differential pressure of the damping valve 197 of the compression-side damping force generation mechanism 105 acting on the disc 195 and the contact disc 162 is that force in the opening direction applied from the passage 102 formed in the piston 18 becomes greater than force in the closing direction applied from the pilot chamber 190. Thus, in this area, the damping valve 197 is opened according to the increase of the piston speed so as to be separated from the seat portion 108. In this manner, in addition to the flow to the upper chamber 19 via the discs 169 to 172 and the seat portion 187, oil flows to the upper chamber 19 via the passage 198 along the radial direction between the piston 18 and the pilot case 168, and thus the increase of the damping force is suppressed. At this time, the characteristics of the damping force relative to the piston speed are that the rate of the increase of the damping force relative to the increase of the piston speed is almost zero. Thus, in a case of generating impact shock due to a difference in level of the road surface or the like in which the piston speed is high and the frequency is relatively high, it is possible to sufficiently absorb the shock by suppressing the increase of the damping force relative to the increase of the piston speed.

In the maximum-length-side predetermined range in which the piston rod 21 extends further to the outer side of the cylinder 2 than the maximum-length-side predetermined position, the maximum-length-side characteristics are obtained in which the extension-side damping force is in a soft state and the compression-side damping force is in a hard state.

Meanwhile, in a minimum-length-side predetermined range in which the piston rod 21 enters further the inside of the cylinder 2 than a minimum-length-side predetermined position, the length of the rebound spring 38 is not shortened. Therefore, the passage area adjustment mechanism 91 illustrated in FIG. 2 is not pressed by the spring mechanism 90 including the rebound spring 38, and the opening and closing disc 76 is separated from the contact disc 79 so that the passage area of the orifice 88 of the passage 89 becomes maximum. In addition, in the minimum-length-side predetermined range, the passage area adjustment mechanism 227 illustrated in FIG. 3 positions the small diameter hole portion 48 to be aligned with the large diameter axial portion 222 of the metering pin 31 in the axial direction so as to cause the orifice 225 to be closed. In the minimum-length-side predetermined range, the in-rod passage 32 communicates with the upper chamber 19 via the passage 89 illustrated in FIG. 2. In this manner, the pilot chamber 140 of the extension-side damping force generation mechanism 104 and the pilot chamber 190 of the compression-side damping force generation mechanism 105 illustrated in FIG. 3 communicate with the upper chamber 19 via the in-rod passage 32.

In the minimum-length-side predetermined range, during the extension stroke in which the piston rod 21 extends to the outside of the cylinder 2, the piston 18 is moved to the upper chamber 19 side, the pressure of the upper chamber 19 is increased, and the pressure of the lower chamber 20 is decreased. Then, the pressure of the upper chamber 19 acts on the disc 145 and the contact disc 112 of the damping valve 147 of the extension-side damping force generation mechanism 104 via the extension-side passage 101 formed in the piston 18. At this time, since the pilot chamber 140 that applies the pilot pressure in a direction of the seat portion 107 against the valve member 113 and the contact disc 112 communicates with the upper chamber 19 via the passage 89 and the in-rod passage 32 illustrated in FIG. 2, and the pilot chamber inflow passage 141 illustrated in FIG. 3, the pilot chamber 140 has a pressure close to that of the upper chamber 19, and thus the pressure of the upper chamber 19 and the pilot pressure are increased.

In this state, since the pressure increase of the pilot chamber 140 can follow the pressure increase of the upper chamber 19 when the piston speed is slow. Therefore, the differential pressure acting on the valve member 113 and the contact disc 112 is decreased, and thus the valve member 113 and the contact disc 112 become difficult to be separated from the seat portion 107. Thus, the oil from the upper chamber 19 passes through the passage 89 and the in-rod passage 32 illustrated in FIG. 2, and the pilot chamber inflow passage 141 and the pilot chamber 140 illustrated in FIG. 3, and flows to the lower chamber 20 via the orifice 154 of the disc valve 153, and thereby damping force having orifice characteristics (the damping force is approximately proportional to the square of the piston speed) is generated. Therefore, the characteristics of the damping force relative to the piston speed are that the rate of the increase of the damping force relative to the increase of the piston speed becomes high.

Even when the piston speed is fast, the separation of the valve member 113 and the contact disc 112 from the seat portion 107 does not happen. Therefore, the oil from the upper chamber 19 passes through the passage 89 and the in-rod passage 32 illustrated in FIG. 2, and the pilot chamber inflow passage 141 and the pilot chamber 140 illustrated in FIG. 3, and flows to the lower chamber 20 via the seat portion 137 and the discs 119 to 122 while opening the disc valve 153. Thereby, damping force having valve characteristics (the damping force is approximately proportional to the piston speed) is generated. Therefore, the characteristics of the damping force relative to the piston speed are that the rate of the increase of the damping force relative to the increase of the piston speed is slightly decreased.

In this manner, the damping force during the extension stroke becomes high, and the extension-side damping force is in a hard state.

In addition, in the minimum-length-side predetermined range, during the compression stroke in which the piston rod 21 enters the inside of the cylinder 2, the piston 18 is moved to the lower chamber 20 side, the pressure of the lower chamber 20 is increased, and the pressure of the upper chamber 19 is decreased. Then, the hydraulic pressure of the lower chamber 20 acts on the disc 195 and the contact disc 162 of the damping valve 197 of the compression-side damping force generation mechanism 105 via the compression-side passage 102 formed in the piston 18. At this time, the pilot chamber 190 that applies the pilot pressure in a direction of the seat portion 108 against the damping valve 197 communicates with the upper chamber 19 via the passage 89 and the in-rod passage 32 illustrated in FIG. 2, and the pilot chamber inflow passage 191 illustrated in FIG. 3. Therefore, the pilot chamber 190 has a pressure close to that of the upper chamber 19, and the pilot pressure is decreased. Accordingly, the differential pressure acting on the valve member 163 and the contact disc 162 is increased, and thus the valve member 163 and the contact disc 162 are relatively easily opened to be separated from the seat portion 108, thereby causing oil to flow to the upper chamber 19 side via the passage 198 along the radial direction between the piston 18 and the pilot case 168.

In this manner, the damping force during the compression stroke becomes smaller than the damping force during the extension stroke, and the compression-side damping force is in a soft state.

In the minimum-length-side predetermined range in which the piston rod 21 enters further the inside of the cylinder 2 than the minimum-length-side predetermined position, the minimum-length-side characteristics are obtained in which the extension-side damping force is in a hard state, and the compression-side damping force is in a soft state.

The shock absorber 1 of the embodiment obtains inverse-type change characteristics of the position-sensitive damping force in which the relationship of the hard state and the soft state is inverse between the maximum-length-side predetermined range and the minimum-length-side predetermined range by including the passage area adjustment mechanisms 91 and 227.

In addition to the configuration for obtaining the position-sensitive damping force characteristics, the shock absorber 1 of the embodiment is provided with the damping force generation mechanism 312 illustrated in FIG. 4 that operates independently from the configuration for obtaining the position-sensitive damping force characteristics. The friction member 24 of the damping force generation mechanism 312 adjusts acting force to the piston rod 21 when the piston speed is very low speed and slight amplitude is input. That is, if the friction member 24 is used, when the piston speed is very low speed and slight amplitude is input, in a frictional region in which the piston speed starts from 0, the friction member 24 generates spring force by the elastic deformation of the elastic rubber portion 291 without causing the sliding with the piston rod 21, and the spring force becomes the acting force (dynamic spring region). After that, when the piston rod 21 moves equal to or greater than a certain extent (0.1 mm), sliding occurs between the friction member 24 and the piston rod 21, and dynamic frictional force is generated (dynamic frictional region). In the embodiment, a dynamic spring constant when the piston speed is very low speed and slight amplitude is input, is improved and a dynamic frictional coefficient is increased by the friction member 24. Thus, it is possible to further increase damping force compared to the damping force by the damping force generation mechanisms 104 and 105 of the shock absorber 1 which includes the passage area adjustment mechanisms 91 and 227 without including the friction member 24.

Next, the details of the valve members 113 and 163 which are common components will be described with reference to mainly FIGS. 5 to 7 by taking the valve member 113 as an example.

As described above, the valve member 113 includes the perforated disc-shaped disc 145, and the seal member 146 that is provided to be fixed to the outer circumferential portion of the disc 145. The disc 145 is made of a steel plate, and the seal member 146 is formed of an elastic rubber material such as nitrile rubber and fluoro rubber.

Figure 5:
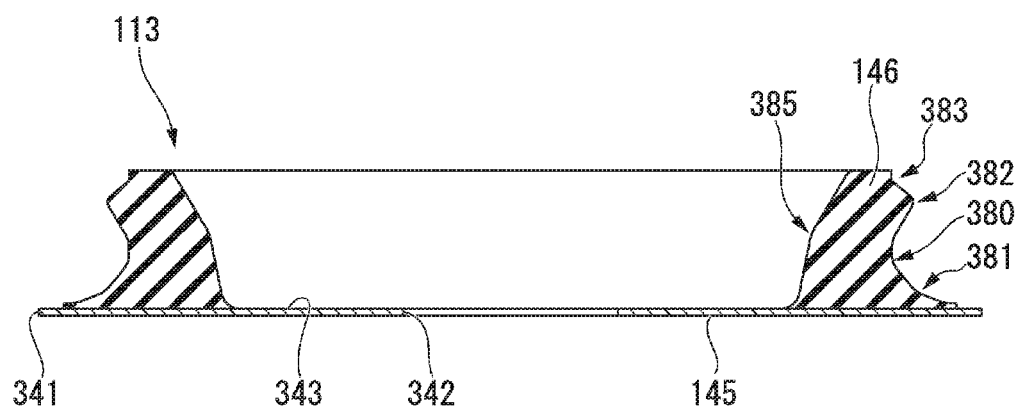
FIG. 5 is a sectional view illustrating a seal member of the shock absorber according to the embodiment of the invention.
Figure 6:
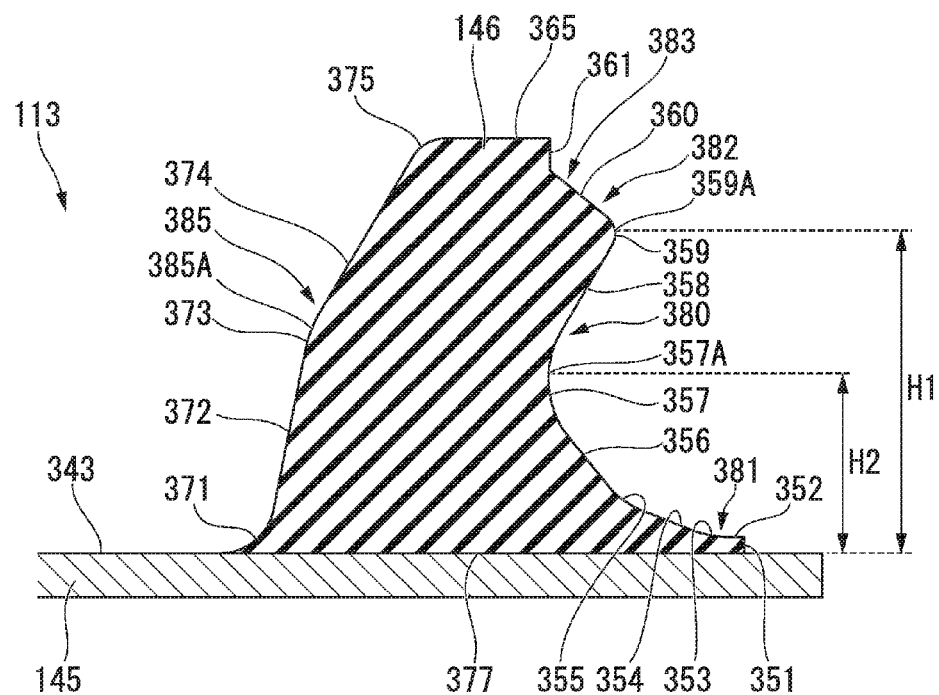
FIG. 6 is a partial enlarged sectional view illustrating the seal member of the shock absorber according to the embodiment of the invention.
Figure 7A:
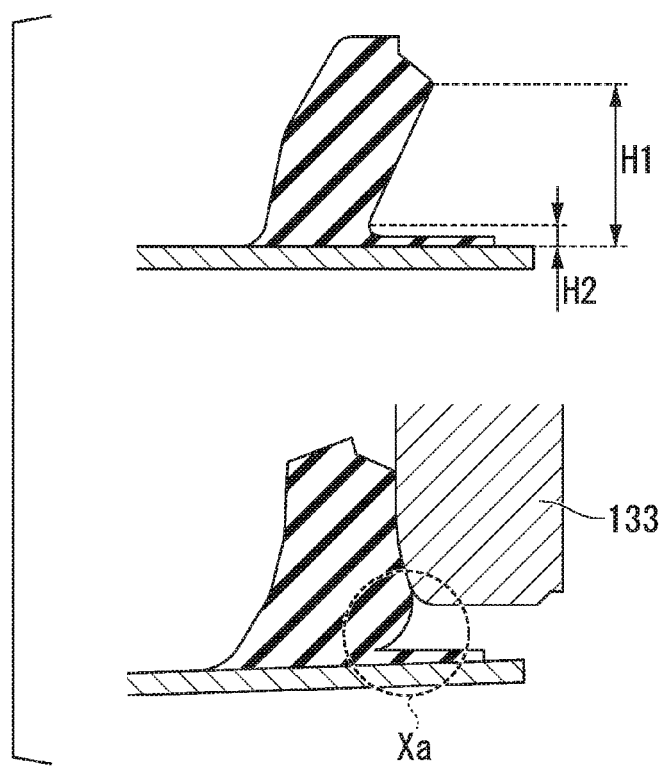
FIG. 7A is a partial enlarged sectional view illustrating a natural state and a modified state of the seal member and illustrates a comparison example for the natural state and the modified state.
Figure 7B:
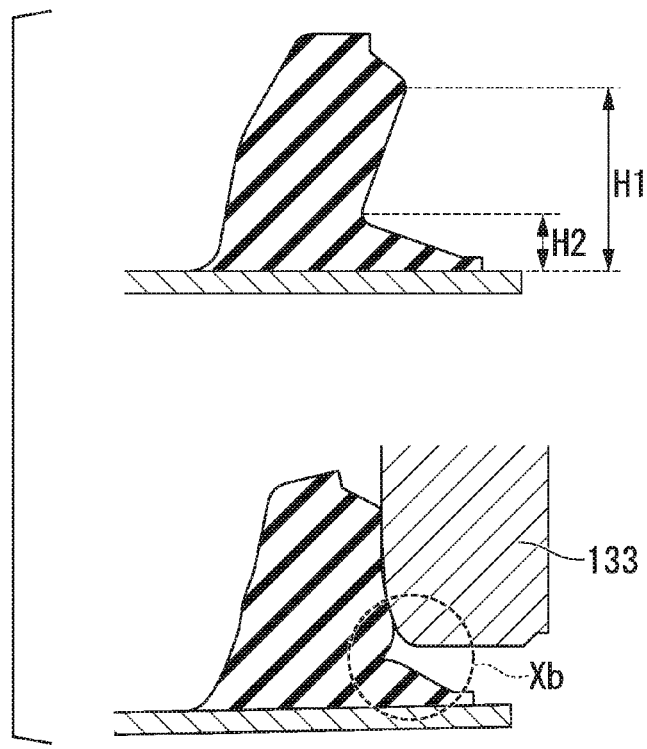
FIG. 7B is a partial enlarged sectional view illustrating a natural state and a modified state of the seal member and illustrates a comparison example for the natural state and the modified state.
Figure 7C:
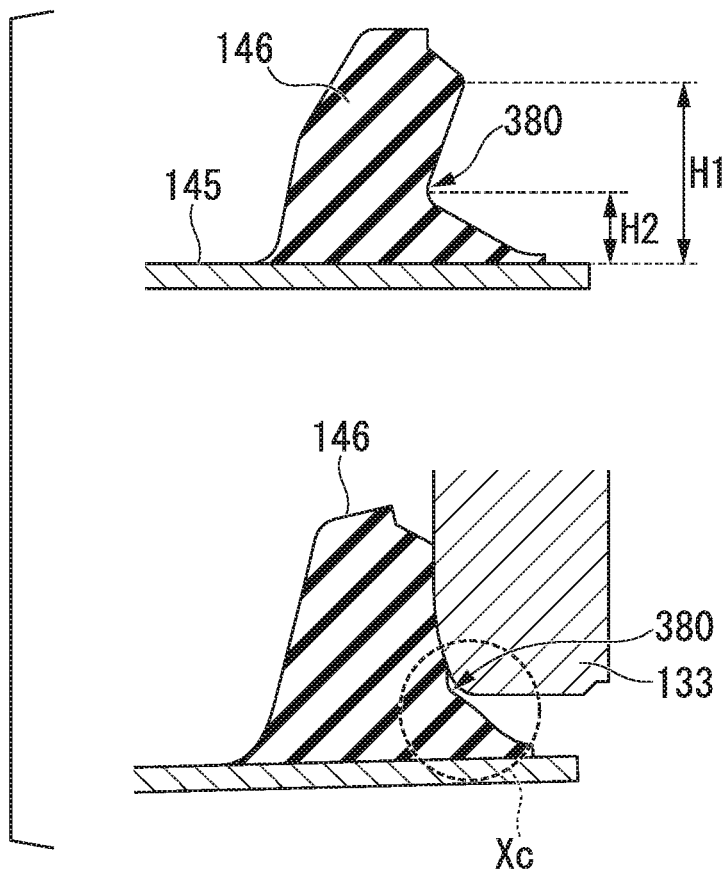
FIG. 7C is a partial enlarged sectional view illustrating a natural state and a modified state of the seal member and illustrates an example of the invention.

In FIGS. 5 and 6, the valve member 113 is illustrated in a natural state before being incorporated in the shock absorber 1. The natural state will be described. As described in FIG. 5, the central axes of the disc 145 and the seal member 146 coincide with each other. These central axes are the central axis of the valve member 113. The disc 145 is formed into a flat plate shape of which the position in the axial direction is constant. In the disc 145, a cylindrical surface 341 is formed in the outer circumferential portion, a cylindrical surface 342 is formed in the inner circumferential portion, and the cylindrical surfaces 341 and 342 are concentrically disposed. In the disc 145, a surface on the first side in the axial direction is a fixing surface 343 to which the seal member 146 is fixed, and the fixing surface 343 is the rear surface disposed on a side opposite to the seat portion 107 illustrated in FIG. 3.

As described in FIG. 6, in the seal member 146, the outer circumferential surface in the radial direction is configured of a base end cylindrical surface portion 351, a planar surface portion 352, a curved surface portion 353, a tapered surface portion 354, a curved surface portion 355, a tapered surface portion 356, a curved surface portion 357, a tapered surface portion 358, a curved surface portion 359, a tapered surface portion 360, and a distal end cylindrical surface portion 361.

The base end cylindrical surface portion 351 is on a side closest to the disc 145 out of the outer circumferential surface of the seal member 146, and extends from the fixing surface 343 of the disc 145 so as to have a cylindrical shape with the central axis of the valve member 113 as a center. The planar surface portion 352 extends inward in the radial direction with a certain width, from an edge portion of the base end cylindrical surface portion 351 on a side opposite to the disc 145. The planar surface portion 352 is formed into an annular shape with the central axis of the valve member 113 as a center, and is disposed on the same plane orthogonal to the central axis of the valve member 113.

The curved surface portion 353 is formed into an annular shape with the central axis of the valve member 113 as a center. The curved surface portion 353 extends from the inner circumferential edge portion of the planar surface portion 352 by being slightly inclined so as to be separated from the disc 145 in the axial direction as the curved surface portion 353 is toward the inner side in the radial direction. The cross-sectional shape of the curved surface portion 353 including the central axis thereof is an arc shape having a center on the outside of the seal member 146. The tapered surface portion 354 extends from the inner circumferential edge portion of the curved surface portion 353 by being inclined so as to be separated from the disc 145 in the axial direction as the tapered surface portion 354 is toward the inner side in the radial direction, and is formed into a tapered shape with the central axis of the valve member 113 as a center.

The curved surface portion 355 is formed into an annular shape with the central axis of the valve member 113 as a center. The curved surface portion 355 extends from the inner circumferential edge portion of the tapered surface portion 354 so as to be separated from the disc 145 as the curved surface portion 355 is toward the inner side in the radial direction. The cross-sectional shape of the curved surface portion 355 including the central axis thereof is an arc shape having a center on the outside of the seal member 146. The tapered surface portion 356 extends from the inner circumferential edge portion of the curved surface portion 355 so as to be separated from the disc 145 as the tapered surface portion 356 is toward the inner side in the radial direction, and is formed into a tapered shape with the central axis of the valve member 113 as a center. Here, the tapered amount, which is obtained by dividing the difference between a diameter at a large-diameter-side predetermined position and a diameter at a small-diameter-side predetermined position by the length in the axial direction between those positions, of the tapered surface portion 356 is smaller than that of the tapered surface portion 354.

The curved surface portion 357 is formed into an annular shape with the central axis of the valve member 113 as a center. The curved surface portion 357 extends from the inner circumferential edge portion of the tapered surface portion 356 so as to have a smaller diameter as curved surface portion 357 is separated from the disc 145 in the axial direction, thereby becoming a minimum diameter portion 357A, and the curved surface portion 357 extends from the minimum diameter portion 357A so as to have a larger diameter as the curved surface portion 357 is separated from the disc 145 in the axial direction. The cross-sectional shape of the curved surface portion 357 including the central axis thereof is an arc shape having a center on the outside of the seal member 146. The tapered surface portion 358 extends from an edge portion of the curved surface portion 357 on a side opposite to the tapered surface portion 356 so as to have a larger diameter as the tapered surface portion 358 is separated from the disc 145 in the axial direction, and is formed into a tapered shape with the central axis of the valve member 113 as a center. The tapered amount of the tapered surface portion 358 is smaller than that of the tapered surface portion 356.

The curved surface portion 359 is formed into an annular shape with the central axis of the valve member 113 as a center. The curved surface portion 359 extends from an edge portion of the tapered surface portion 358 on a side opposite to the curved surface portion 357 so as to have a larger diameter as the curved surface portion 359 is separated from the disc 145 in the axial direction, and forms a maximum diameter portion 359A. The curved surface portion 359 extends from the maximum diameter portion 359A so as to have a smaller diameter as the curved surface portion 359 is separated from the disc 145 in the axial direction. The cross-sectional shape of the curved surface portion 359 including the central axis thereof is an arc shape having a center on the inside of the seal member 146. The tapered surface portion 360 extends from an edge portion of the curved surface portion 359 on a side opposite to the tapered surface portion 358 so as to have a smaller diameter as the tapered surface portion 360 is separated from the disc 145 in the axial direction, and is formed into a tapered shape with the central axis of the valve member 113 as a center. The tapered amount of the tapered surface portion 360 is smaller than that of the tapered surface portion 354, and is larger than that of the tapered surface portion 356. The distal end cylindrical surface portion 361 extends from an edge portion of the tapered surface portion 360 on a side opposite to the curved surface portion 359 in a direction opposite to the disc 145, and is formed into a cylindrical shape with the central axis of the valve member 113 as a center. The distal end cylindrical surface portion 361 is most on a side opposite to the disc 145 out of the outer circumferential surface of the seal member 146. The diameter of the distal end cylindrical surface portion 361 is equivalent to that of the minimum diameter portion 357A of the curved surface portion 357.

A tip surface portion 365 positioned most on a side opposite to the disc 145 in the seal member 146 is formed on a side of the distal end cylindrical surface portion 361 opposite to the disc 145. The tip surface portion 365 extends inward in the radial direction with a certain width, from an edge portion of the distal end cylindrical surface portion 361 on a side opposite to the disc 145. The tip surface portion 365 is formed into an annular shape with the central axis of the valve member 113 as a center, and is disposed on the same plane orthogonal to the central axis of the valve member 113.

The inner circumferential surface of the seal member 146 is configured of a curved surface portion 371, a tapered surface portion 372, a curved surface portion 373, a tapered surface portion 374, and a curved surface portion 375.

The curved surface portion 371 is on a side closest to the disc 145 out of the inner circumferential surface of the seal member 146, and is formed into an annular shape with the central axis of the valve member 113 as a center. The curved surface portion 371 extends from the fixing surface 343 of the disc 145 so as to have a larger diameter as the curved surface portion 371 is separated from the disc 145 in the axial direction. The cross-sectional shape of the curved surface portion 371 including the central axis thereof is an arc shape having a center on the outside of the seal member 146. The tapered surface portion 372 extends from an edge portion of the curved surface portion 371 on a side opposite to the disc 145 so as to have a larger diameter as the tapered surface portion 372 is separated from the disc 145 in the axial direction, and is formed into a tapered shape with the central axis of the valve member 113 as a center.

The curved surface portion 373 is formed into an annular shape with the central axis of the valve member 113 as a center. The curved surface portion 373 extends from an edge portion of the tapered surface portion 372 on a side opposite to the disc 145 so as to have a larger diameter as the curved surface portion 373 is separated from the disc 145 in the axial direction. The cross-sectional shape of the curved surface portion 373 including the central axis thereof is an arc shape having a center on the inside of the seal member 146. The tapered surface portion 374 extends from an edge portion of the curved surface portion 373 on a side opposite to the tapered surface portion 372 so as to have a larger diameter as the tapered surface portion 374 is separated from the disc 145 in the axial direction, and is formed into a tapered shape with the central axis of the valve member 113 as a center. The tapered amount of the tapered surface portion 374 is larger than that of the tapered surface portion 372. The curved surface portion 375 is formed into an annular shape with the central axis of the valve member 113 as a center. The curved surface portion 375 extends from an edge portion of the tapered surface portion 374 on a side opposite to the disc 145 so as to have a larger diameter as the curved surface portion 375 is separated from the disc 145 in the axial direction, and is connected to the inner circumferential edge portion of the tip surface portion 365. The cross-sectional shape of the curved surface portion 375 including the central axis thereof is an arc shape having a center on the inside of the seal member 146.

A concave portion 380 that is recessed inward in the radial direction is formed on the outer circumferential side of the seal member 146 by the planar surface portion 352, the curved surface portion 353, the tapered surface portion 354, the curved surface portion 355, the tapered surface portion 356, the curved surface portion 357, the tapered surface portion 358, and a portion of the curved surface portion 359 on the tapered surface portion 358 side rather than the maximum diameter portion 359A side. The deepest portion of the concave portion 380 forms the minimum diameter portion 357A of the curved surface portion 357. The cross-sectional shape of the concave portion 380 including the central axis thereof is a curved surface shape as a whole.

In addition, a convex portion 381 that protrudes outward in the radial direction is formed on the outer circumferential side of the seal member 146 by a bonding surface 377 bonded to the fixing surface 343, the base end cylindrical surface portion 351, the planar surface portion 352, the curved surface portion 353, the tapered surface portion 354, the curved surface portion 355, the tapered surface portion 356, and a portion of the curved surface portion 357 on the tapered surface portion 356 side rather than the minimum diameter portion 357A side.

In addition, a convex portion 382 that protrudes outward in the radial direction is formed on the outer circumferential side of the seal member 146 and is configured of a portion of the curved surface portion 357 on a side closer to the tapered surface portion 358 than the minimum diameter portion 357A, the tapered surface portion 358, the curved surface portion 359, and the tapered surface portion 360. The highest portion of the convex portion 382 forms the maximum diameter portion 359A of the curved surface portion 359.

In addition, a notch portion 383 that is cut toward the outer circumferential side and a side opposite to the disc 145 in the axial direction is formed on the outer circumferential side of the seal member 146 and is configured of a portion of the curved surface portion 359 on a side closer to the tapered surface portion 360 than the maximum diameter portion 359A, the tapered surface portion 360, and the distal end cylindrical surface portion 361. All of the concave portion 380, the convex portion 381, the convex portion 382, and the notch portion 383 are formed into an annular shape with the central axis of the valve member 113 as a center.

A convex portion 385 that protrudes outward in the radial direction is formed on the inner circumferential side of the seal member 146 and is configured of the tapered surface portion 372, the curved surface portion 373, and the tapered surface portion 374. The convex portion 385 is also formed into an annular shape with the central axis of the valve member 113 as a center. The protrusion direction of the convex portion 385 is an oblique direction in which the convex portion 385 is close to the central axis of the valve member 113 and is separated from the disc 145 in the axial direction as the direction is toward the protrusion tip side. A position on the curved surface portion 373 at which bisectors of the extension plane of the tapered surface portion 372 and the extension plane of the tapered surface portion 374 are extended from the line of intersection between the extension planes and intersect each other is an apex 385A of the convex portion 385.

In the seal member 146, the apex 385A of the convex portion 385 is formed within a range of the concave portion 380 in the axial direction of the seal member 146. The distance of the apex 385A of the convex portion 385 from the disc 145 is larger than that of the minimum diameter portion 357A of the concave portion 380 from the disc 145. In addition, in the seal member 146, one concave portion 380 is formed in a range of equal to or greater than 50% of the length of the seal member 146 in the axial direction, preferably equal to or greater than 70% thereof.

In the seal member 146, the height H2 of the minimum diameter portion 357A of the concave portion 380 from the disc 145 is greater than ⅓ of the height H1 of the maximum diameter portion 359A from the disc 145, the maximum diameter portion 359A having the largest diameter in a side farther from the disc 145 on the outer circumferential portion of the seal member 146 than the minimum diameter portion 357A.

The seal member 146 of the valve member 113 is fitted into the outer tube 133 of the pilot case 118 illustrated in FIG. 3 with an interference. The interference is set such that the seal member 146 is fitted so as to be slidable with respect to the outer tube 133 and to be in a liquid tight manner all the times.

In the shock absorber described in PTL 1, a seal disc forms a pilot chamber between the seal disc and a pilot case by fitting a seal member in the pilot case. Then, opening of the valve is suppressed by the pressure of the pilot chamber.

In such a structure, in particular, if the pressure of the pilot chamber becomes high, the durability of the seal member may be decreased. In addition, if the pressure of the pilot chamber becomes high, the seal member may be caught in the pilot chamber to cause unstable sliding, and as a result, damping force characteristics may become unstable.

In contrast, in the shock absorber 1 of the embodiment, since the annular concave portion 380 is formed on the outer circumferential side of the seal member 146, the convex portion 381 that protrudes outward in the radial direction is formed on the disc 145 side of the concave portion 380. Thus, the volume of the seal member 146 on a side fixed to the disc 145 can be increased by the convex portion 381. Therefore, it is possible to improve the rigidity of the seal member 146 on a side fixed to the disc 145. In addition, since the annular concave portion 380 is formed on the outer circumferential side of the seal member 146, it is possible to suppress unsuitable deformation of the outer circumferential side of the seal member 146 when the seal member 146 is in close contact with the outer tube 133. In addition since the annular convex portion 385 is formed on the inner circumferential side and the reduction in volume due to the concave portion 380 is supplemented by the convex portion 385 to secure the rigidity, it is possible to suppress abnormal deformation of the inner circumferential side of the seal member 146. As above, it is possible to improve the durability of the seal member 146. For the seal member 196 which is a common component with the seal member 146, it is possible to similarly improve the durability.

In addition, in the shock absorber 1 of the embodiment, the height H2 of the minimum diameter portion 357A of the annular concave portion 380 of the outer circumferential portion of the seal member 146 from the disc 145 is greater than ⅓ of the height H1 of the maximum diameter portion 359A from the disc 145, the maximum diameter portion 359A having the largest diameter in a side farther from the disc 145 on the outer circumferential portion of the seal member 146 than the minimum diameter portion 357A. Therefore, it is possible to improve the durability of the seal member 146. That is, if the height H2 is extremely smaller than ⅓ of the height H1 as illustrated in the upper portion of FIG. 7A, the concave portion on the outer circumferential side of the seal member is deformed to have an abnormal shape being curved at an acute angle when being fitted into the outer tube 133 as surrounded by a broken line Xa in the lower portion of FIG. 7A. Even if the height H2 is close to ⅓ of the height H1 as illustrated in the upper portion of FIG. 7B, when the height H2 is smaller than ⅓ of the height H1, the concave portion on the outer circumferential side of the seal member is deformed to have an abnormal shape being curved at an acute angle when being fitted into the outer tube 133 as surrounded by a broken line Xb in the lower portion of FIG. 7B. In contrast to this, if the height H2 is greater than ⅓ of the height H1 as illustrated in the upper portion of FIG. 7C, the concave portion 380 of the seal member 146 is deformed at an obtuse angle when being fitted into the outer tube 133 as surrounded by a broken line Xc in the lower portion of FIG. 7C, which does not become abnormal. Therefore, it is possible to improve the durability of the seal member 146. For the seal member 196 which is a common component with the seal member 146, it is possible to similarly improve the durability.

In the seal member 146, the apex 385A of the convex portion 385 is formed within the range of the concave portion 380 in the axial direction of the seal member 146, and the distance of the apex 385A of the convex portion 385 from the disc 145 is larger than that of the minimum diameter portion 357A of the concave portion 380 from the disc 145. With such a shape, as illustrated in the lower portion of FIG. 7C, it is possible to obtain a shape in which the inner circumferential side of the seal member 146 becomes smooth when being used. Thus, when the pressure in the pilot chamber 140 is increased, it is possible for the inner circumferential side to receive the pressure as a whole.

With the shape described above, even if the pressure in the pilot chambers 140 and 190 becomes high, it is possible to suppress abnormal deformation of the seal members 146 and 196 and to improve the durability of the seal members 146 and 196. Therefore, it is possible to introduce higher pressure into the pilot chambers 140 and 190. In this manner, it is possible to suppress opening of the damping valves 147 and 197, and to set the damping force to be in a hard state. In addition, since the abnormal deformation of the seal members 146 and 196 can be suppressed, even if the pressure of the pilot chambers 140 and 190 is set to be high so as to be in a hard state, it is possible to make sliding of the seal members 146 and 196 with respect to the pilot cases 118 and 168 smooth. Thus, it is possible to stabilize the damping force characteristic by suppressing the variation of the damping force characteristics.

In addition, the rigidity of the seal members 146 and 196 on a side fixed to the disc 145 is increased to obtain a shape in which the deformation is prevented, and thus it is possible to cause the seal members 146 and 196 to extend in the axial direction and improve spring properties. Since a configuration is adopted in which the volume of the convex portion 385 is increased compared to that in the related art, and the interference of the pilot case 118 with respect to the outer tube 133 is increased, it is possible to increase frictional force with respect to the pilot case 118. In this manner, it is possible to improve the responsiveness when performing a valve closing operation after the valve member 113 is opened.

Furthermore, the convex portion 381 that protrudes outward in the radial direction and is formed on the disc 145 side of the concave portion 380 has a larger diameter than that of the maximum diameter portion 359A, that is, the convex portion 381 extends up to a position separated from the central axis of the valve member 113. In this manner, the volume of the seal member 146 on a side fixed to the disc 145 can be increased by the convex portion 381.

The shock absorber of the embodiment includes a cylinder in which operating fluid is enclosed; a piston that is slidably fitted into the cylinder; a piston rod of which a first end side is coupled to the piston and a second end side extends to the outside of the cylinder; a damping valve that suppresses a flow of the operating fluid due to the sliding of the piston to generate damping force; a bottomed tubular pilot case that forms a pilot chamber that causes pressure to act on the damping valve in a valve closing direction, together with the damping valve; and an annular seal member that is provided to be fixed to the outer circumferential side of a rear surface of the damping valve, and is fitted into a tube of the pilot case so as to be slidable and to be in a liquid tight manner. The damping valve is configured such that the inner circumferential side is clamped and the outer circumferential side is opened, and a part of the flow of the operating fluid is guided to the pilot chamber and opening of the damping valve is suppressed by the pressure of the pilot chamber. An annular concave portion is formed on the outer circumferential side of the seal member, and an annular convex portion is formed on the inner circumferential side of the seal member. In this manner, the seal member is provided with the convex portion that protrudes outward in the radial direction on the damping valve side of the concave portion. Thus, the volume of the seal member on a side fixed to the damping valve can be increased by the convex portion. Therefore, it is possible to improve the rigidity of the seal member on a side fixed to the damping valve. In addition, since the annular concave portion is formed on the outer circumferential side of the seal member, it is possible to suppress abnormal deformation of the outer circumferential side of the seal member when the seal member is in close contact with the tube. Since the annular convex portion is formed on the inner circumferential side of the seal member, the reduction in volume due to the concave portion can be supplemented by the convex portion to secure the rigidity, and it is possible to suppress abnormal deformation of the inner circumferential side of the seal member. Thus, it is possible to improve the durability of the seal member.

In addition, the shock absorber of the embodiment includes a cylinder in which operating fluid is enclosed; a piston that is slidably fitted into the cylinder; a piston rod of which a first end side is coupled to the piston and a second end side extends to the outside of the cylinder; a damping valve that suppresses a flow of the operating fluid due to the sliding of the piston to generate damping force; a bottomed tubular pilot case that forms a pilot chamber that causes pressure to act on the damping valve in a valve closing direction, together with the damping valve; and an annular seal member that is provided to be fixed to the outer circumferential side of a rear surface of the damping valve, and is fitted into a tube of the pilot case so as to be slidable and to be in a liquid tight manner. The damping valve is configured such that the inner circumferential side is clamped and the outer circumferential side is opened, and a part of the flow of the operating fluid is guided to the pilot chamber and opening of the damping valve is suppressed by the pressure of the pilot chamber. An annular concave portion is formed on an outer circumferential portion of the seal member, and a height of a minimum diameter portion of the concave portion from the damping valve is greater than ⅓ of a height of a maximum diameter portion from the damping valve, the maximum diameter portion having the largest diameter in a side farther from the damping valve on the outer circumferential portion of the seal member than the minimum diameter portion. Accordingly, it is possible to improve the durability of the seal member.

In addition, the maximum diameter portion having the largest diameter may be formed on the outer circumferential side of the seal member further on a side separating from the damping valve than the annular concave portion, and a damping-valve-side convex portion that protrudes further outward in a radial direction than the maximum diameter portion may be provided on the damping valve side of the seal member.

In addition, a distance of an apex of the convex portion from the damping valve may be greater than a distance of the minimum diameter portion of the concave portion from the damping valve.

In the embodiment, a case in which the invention is used in the double cylinder type hydraulic shock absorber is illustrated, but the invention is not limited thereto. The invention may be used in a mono-tube type hydraulic shock absorber in which an outer tube is not provided, and a gas chamber is formed in the cylinder 2 on a side of the lower chamber 20 opposite to the upper chamber 19 by a slidable partition body, and may be used in any shock absorber. Of course, the invention can be applied to the base valve 25. In addition, the invention can be applied to a case in which an oil passage that communicates with the inside of the cylinder 2 is provided on the outside of the cylinder 2, and a damping force generation mechanism is provided in the oil passage.

In the embodiment, the hydraulic shock absorber is exemplified, but water and air can be used as the fluid.

In the embodiment, a configuration including the friction member 24 is exemplified, but the friction member 24 may not be provided even though the damping force is decreased in a very low speed region.

INDUSTRIAL APPLICABILITY

According to the shock absorber described above, it is possible to improve the durability of the seal member.

REFERENCE SIGNS LIST

1: SHOCK ABSORBER
2: CYLINDER
18: PISTON
21 PISTON ROD
118, 168: PILOT CASE
140, 190: PILOT CHAMBER
146, 196: SEAL MEMBER
147, 197: DAMPING VALVE
357A: MINIMUM DIAMETER PORTION
359A: MAXIMUM DIAMETER PORTION
380: CONCAVE PORTION
385: CONVEX PORTION

The invention claimed is:

1. A shock absorber comprising:
a cylinder in which operating fluid is enclosed;
a piston that is slidably fitted into the cylinder;
a piston rod of which a first end side is coupled to the piston and a second side extends to the outside of the cylinder;
a damping valve that suppresses a flow of the operating fluid due to the sliding of the piston to generate damping force;
a bottomed tubular pilot case that forms a pilot chamber that causes pressure to act on the damping valve in a valve closing direction, together with the damping valve; and
an annular seal member that is provided to be fixed to the outer circumferential side of a rear surface of the damping valve, and is fitted into a tube of the pilot case so as to be slidable and to be in a liquid tight manner,
wherein the damping valve is configured such that the inner circumferential side of the damping valve is clamped and the outer circumferential side of the damping valve is opened,
wherein a part of the flow of the operating fluid is guided to the pilot chamber and opening of the damping valve is suppressed by the pressure of the pilot chamber,
wherein an outer circumferential surface of the seal member is formed to have:
a damping-valve-side convex portion provided at a fixed portion at which the seal member is fixed on the damping valve and having an apex protruding outermost in a radial direction of the seal member;
an annular concave portion provided at a position further spaced apart from the damping valve than the damping-valve-side convex portion and recessed inward in the radial direction; and,
a pilot-chamber-side convex portion provided at a position further spaced away from the damping valve than the concave portion, having a smaller diameter than a diameter of the damping-valve-side convex portion and larger diameter than a diameter of the concave portion, and protruding outward in the radial direction from the outer circumferential surface.

2. A shock absorber according to claim 1:
wherein a height of a minimum diameter portion of the concave portion from the damping valve is greater than ⅓ of a height of a maximum diameter portion of the pilot-chamber-side convex portion from the damping valve.

3. The shock absorber according to claim 2,
wherein an inner surface of the seal member is formed to have a convex surface opposing the concave portion, and
wherein a distance of an apex of the convex surface from the damping valve is greater than a distance of the minimum diameter portion of the concave portion from the damping valve.

4. The shock absorber according to claim 1,
wherein an inner surface of the seal member is formed to have a convex surface opposing the concave portion, and
wherein a distance of an apex of the convex surface from the damping valve is greater than a distance of the minimum diameter portion of the concave portion from the damping valve.

5. The shock absorber according to claim 4,
wherein an inner surface of the seal member is formed to have a concave surface at the fixed portion at which the seal member is fixed on the damping valve, the concave surface configured to connect the convex surface and the fixed portion of the damping valve.

* * * * *